(12) United States Patent
Komatsu

(10) Patent No.: US 7,058,282 B2
(45) Date of Patent: Jun. 6, 2006

(54) DATA RECORDING/REPRODUCTION APPARATUS WITH BUILT-IN CAMERA AND DATA RECORDING/REPRODUCTION METHOD

(75) Inventor: Kouji Komatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 09/957,758

(22) Filed: Sep. 20, 2001

(65) Prior Publication Data

US 2002/0037158 A1    Mar. 28, 2002

(30) Foreign Application Priority Data

Sep. 22, 2000   (JP)   ............... P2000-289414

(51) Int. Cl.
  *H04N 5/91*    (2006.01)
  *H04N 5/225*   (2006.01)
(52) U.S. Cl. .................. 386/69; 386/117; 386/118
(58) Field of Classification Search ............ 386/52, 386/55, 95, 117, 118, 113
  See application file for complete search history.

(56) References Cited

U.S. PATENT DOCUMENTS

| | | | | |
|---|---|---|---|---|
| 4,425,586 | A | * | 1/1984 | Miller ..................... 386/117 |
| 5,889,916 | A | * | 3/1999 | Kimura et al. ............. 386/52 |
| 6,282,362 | B1 | * | 8/2001 | Murphy et al. .......... 348/231.3 |
| 2004/0208482 | A1 | * | 10/2004 | Suga et al. ............... 386/117 |
| 2005/0053352 | A1 | * | 3/2005 | McKain et al. ........... 386/117 |

FOREIGN PATENT DOCUMENTS

| | | |
|---|---|---|
| EP | 410 579 | 1/1991 |
| JP | 09 200674 | 7/1997 |
| JP | 09 200675 | 7/1997 |
| JP | 10 177778 | 6/1998 |
| JP | 2000 023081 | 1/2000 |
| JP | 2000 125232 | 4/2000 |
| WO | WO 98 39918 | 9/1998 |

OTHER PUBLICATIONS

Patent Abstracts of Japan vol. 1998, No. 13, Nov. 30, 1998 & JP 10 215426 A (Ricoh Co Ltd), Aug. 11, 1998.

* cited by examiner

Primary Examiner—Vincent F. Boccio
(74) Attorney, Agent, or Firm—Frommer Lawrence & Haug LLP; William S. Frommer

(57) ABSTRACT

The present invention provides index information that can be handled with ease. Microcomputer 7 reads out the video data recorded in video cassette 100 on the basis of the recording information on the video data and generates index-related images on the basis of the read out video data. Then, it generates a retrieval-serving image to be used for retrieving the video data recorded in the video cassette 100, said retrieval-serving image containing the index-related images and the recording information of the video data corresponding to the index-related images, and conserves the retrieval-serving image data at least in internal memory 8 or in external memory 110. Thereafter, it displays the retrieval-serving image conserved in the internal memory 8 or the external memory 110 on image display section 5. As one of the index-related images contained in the retrieval-serving image that is displayed on the image display section 5 is selected, it retrieves the corresponding video data on the basis of the corresponding recording information and reproduces the retrieved video data.

18 Claims, 18 Drawing Sheets

DATA RECORDING/REPRODUCTION APPARATUS WITH BUILT-IN CAMERA AND DATA RECORDING/REPRODUCTION METHOD

BACKGROUND OF THE INVENTION

1. Field of the Invention

This invention relates to a data recording/reproduction apparatus comprising an image pickup section and a built-in camera and adapted to record and reproduce data of the picked up image and also to a data recording/reproduction method.

2. Related Background Art

The video data of the images picked up by an image pickup apparatus such as a video tape recorder having a built-in camera and stored in a recording medium such as a video tape often represent consecutive cuts (pictures taken consecutively or the data of the cuts), each of which is relatively short. Then, the user may need to make efforts for detecting and retrieving a desired cut when he or she wants to confirm the contents of some or all of the cuts and/or edit them.

Japanese Patent Application Laid-Open Publication No. 7-154731 and Japanese Patent Application Laid-Open Publication No. 7-154740 disclose a technique for quickly detecting, retrieving and editing such video data. With the disclosed technique, index information is generated when the picked up video and/or audio data are recorded on a recording and stored in a separate recording medium or in a region directly extending from the recording region of the original data of the same recording medium. Then, in the video tape recording apparatus having a built-in camera that is adapted to operate with this technique, the index information is referred to when the recorded data are retrieved and reproduced, if partly.

However, conventional video tape recorders having a built-in camera are adapted only to display index information in the form of a list of numerical data including the time and date when each of the cuts is picked up and so on. Some users claim that such display of numerical data is not particularly friendly to the user.

BRIEF SUMMARY OF THE INVENTION

In view of the above identified circumstances, the present invention provides a data recording/reproduction apparatus with a built-in camera and a data recording/reproduction method that can provide index information to be handled with ease.

In order to attain the above object, the data recording/reproduction apparatus with a built-in camera according to the present invention comprises, a recording information acquisition means for acquiring recording information on the data of each picked up image in the tape-shaped recording medium and storing them in an internal storage means, an index-related image generating means for reading out the data of each picked up image recorded in the tape-shaped recording medium on the basis of the recording information recorded in the internal storage means and generating index-related images for recognizing the data of the picked up images on the basis of the data of the picked up images, a retrieval-serving image generating means for generating retrieval-serving image data to be used for retrieving the data of the picked up images recorded in the tape-shaped recording medium, the retrieval-serving image data containing those of the index-related image generated by the index-related image generating means and the recording information of the data of the picked up images corresponding to the index-related image, a retrieval-serving image conservation means for conserving the retrieval-serving image data generated by the retrieval-serving image generating means at least in a retrieval-serving image data storage means and, if possible, also in the semiconductor memory, a retrieval-serving image retrieving means for retrieving the recorded data in the semiconductor memory or the retrieval-serving image data storage means and displaying on an image display section a retrieval-serving image formed on the basis of the retrieval-serving image data conserved in the semiconductor memory or the retrieval-serving image data storage means and a reproduction control means for retrieving the data of the picked up image corresponding to the index-related image selected by means of the retrieval-serving image displayed on the image display section by the retrieval-serving image retrieving means on the basis of the recording information and performing a reproducing operation by means of the reproduction means.

Thus, in a data recording/reproduction apparatus with a built-in camera according to the invention, the recording information acquisition means acquires recording information on the data of each picked up image in the tape-shaped recording medium and stores them in an internal storage means. Then, the index-related image generating means reads out the data of each picked up image recorded in the tape-shaped recording medium on the basis of the recording information recorded in the internal storage means and generates an index-related image for recognizing the data of the picked up images on the basis of the data of the picked up images. The retrieval-serving image generating means generates retrieval-serving image data to be used for retrieving the data of the picked up images recorded in the tape-shaped recording medium, the retrieval-serving image data containing those of the index-related image generated by the index-related image generating means and the recording information of the data of the picked up images corresponding to the index-related image. The retrieval-serving image conservation means conserves the retrieval-serving image data generated by the retrieval-serving image generating means at least in a retrieval-serving image data storage means and, if possible, also in the semiconductor memory. The retrieval-serving image retrieving means retrieves the recorded data in the semiconductor memory or the retrieval-serving image data storage means and displays a retrieval-serving image formed on the basis of the retrieval-serving image data conserved in the semiconductor memory or the retrieval-serving image data storage means. Finally the reproduction control means retrieves the data of the picked up image corresponding to the index-related image selected by means of the retrieval-serving image displayed on the image display section by the retrieval-serving image retrieving means on the basis of the recording information and performs a reproducing operation by means of the reproduction means.

In short, a data recording/reproduction apparatus with a built-in camera according to the invention can retrieve the data of each picked up image recorded in the tape-shaped recording medium by means of the retrieval-serving image containing the index-related images of the data of the picked up images recorded in the tape-shaped recording medium and, when an index-related image in the retrieval-serving image is selected, the data of the picked up image is reproduced on the basis of the recording information corresponding to the selected index-related image.

In another aspect of the invention, there is provided a data recording/reproduction method, comprising the steps of recording the data of the picked up image obtained by the image pickup operation of the image pickup section, reproducing the data of the picked up image recorded in the tape-shaped recording medium, acquiring recording information on the data of each picked up image in the tape-shaped recording medium and storing them in an internal storage means, reading out the data of each picked up image recorded in the tape-shaped recording medium on the basis of the recording information recorded in the internal storage means and generating index-related images for recognizing the data of the picked up images on the basis of the data of the picked up images, generating retrieval-serving image data to be used for retrieving the data of the picked up images recorded in the tape-shaped recording medium, the retrieval-serving image data containing those of the index-related image generated by the index-related image generating means and the recording information of the data of the picked up images corresponding to the index-related image, conserving the retrieval-serving image data generated by the retrieval-serving image generating means at least in a retrieval-serving image data storage means and, if possible, also in the semiconductor memory, retrieving the recorded data in the semiconductor memory or the retrieval-serving image data storage means and displaying a retrieval-serving image formed on the basis of the retrieval-serving image data conserved in the semiconductor memory or the retrieval-serving image data storage means and retrieving the data of the picked up image corresponding to the index-related image selected by means of the retrieval-serving image displayed on the image display section by the retrieval-serving image retrieving means on the basis of the recording information and performing a reproducing operation by means of the reproduction means.

In short, a data recording/reproduction method makes it possible to retrieve the data of each picked up image recorded in the tape-shaped recording medium by means of the retrieval-serving image containing the index-related images of the data of the picked up images recorded in the tape-shaped recording medium and, when an index-related image in the retrieval-serving image is selected, the data of the picked up image is reproduced on the basis of the recording information corresponding to the selected index-related image.

As described above, in a data recording/reproduction apparatus with a built-in camera according to the invention, the recording information acquisition means acquires recording information on the data of each picked up image in the tape-shaped recording medium and stores them in an internal storage means. Then, the index-related image generating means reads out the data of each picked up image recorded in the tape-shaped recording medium on the basis of the recording information recorded in the internal storage means and generates an index-related image for recognizing the data of the picked up images on the basis of the data of the picked up images. The retrieval-serving image generating means generates retrieval-serving image data to be used for retrieving the data of the picked up images recorded in the tape-shaped recording medium, the retrieval-serving image data containing those of the index-related image generated by the index-related image generating means and the recording information of the data of the picked up images corresponding to the index-related image. The retrieval-serving image conservation means conserves the retrieval-serving image data generated by the retrieval-serving image generating means at least in a retrieval-serving image data storage means and, if possible, also in the semiconductor memory. The retrieval-serving image retrieving means retrieves the recorded data in the semiconductor memory or the retrieval-serving image data storage means and displays a retrieval-serving image formed on the basis of the retrieval-serving image data conserved in the semiconductor memory or the retrieval-serving image data storage means. Finally the reproduction control means retrieves the data of the picked up image corresponding to the index-related image selected by means of the retrieval-serving image displayed on the image display section by the retrieval-serving image retrieving means on the basis of the recording information and performs a reproducing operation by means of the reproduction means. In short, a data recording/reproduction apparatus with a built-in camera according to the invention can retrieve the data of each picked up image recorded in the tape-shaped recording medium by means of the retrieval-serving image containing the index-related images of the data of the picked up images recorded in the tape-shaped recording medium and, when an index-related image in the retrieval-serving image is selected, the data of the picked up image is automatically reproduced on the basis of the recording information corresponding to the selected index-related image.

A data recording/reproduction method according to the invention comprises the steps of recording data of the picked up image obtained in the image pickup section in the tape-shaped recording medium, acquiring recording information on a plurality of data of the picked up images in the tape-shaped recording medium and storing them in an internal storage means, reading out the data of each picked up image recorded in the tape-shaped recording medium on the basis of the recording information recorded in the internal storage means and generating index-related images for recognizing the data of the picked up images on the basis of the data of the picked up images, generating retrieval-serving image data to be used for retrieving the data of the picked up images recorded in the tape-shaped recording medium, the retrieval-serving image data containing those of the index-related image generated by the index-related image generating means and the recording information of the data of the picked up images corresponding to the index-related image, conserving the retrieval-serving image data generated by the retrieval-serving image generating means at least in a retrieval-serving image data storage means and, if possible, also in the semiconductor memory, retrieving the recorded data in the semiconductor memory or the retrieval-serving image data storage means and displaying a retrieval-serving image formed on the basis of the retrieval-serving image data conserved in the semiconductor memory or the retrieval-serving image data storage means and retrieving the data of the picked up image corresponding to the index-related image selected by means of the retrieval-serving image displayed on the image display section by the retrieval-serving image retrieving means on the basis of the recording information and performing a reproducing operation by means of the reproduction means. In short, a data recording/reproduction method makes it possible to retrieve the data of each picked up image recorded in the tape-shaped recording medium a by means of the retrieval-serving image containing the index-related images of the data of the picked up images recorded in the tape-shaped recording medium and, when an index-related image in the retrieval-serving image is selected, the data of the picked up image is automatically reproduced on the basis of the recording information corresponding to the selected index-related image.

DETAILED DESCRIPTION OF THE INVENTION

Now, the present invention will be described in greater detail by referring to the accompanying drawings that illustrate a preferred embodiment of the invention. This embodiment is a video tape recorder (to be referred to as VCR hereinafter) with a built-in camera. The VCR of this embodiment is adapted to operate for recording and reproducing images as ordinary video tape recorder having a built-in camera. More specifically, it operates as recording device for recording video data in a recording medium such as video tape and also as reproduction device for reproducing video data recorded in a video tape. In other words, the recording function and the reproducing function of the VCR of this embodiment are similar to those of an ordinary video tape recorder with a built-in camera except the functional features specifically described hereinafter. Therefore, only the functional features of the VCR of this embodiment that are specific to the present invention will be described below.

Figure 1:
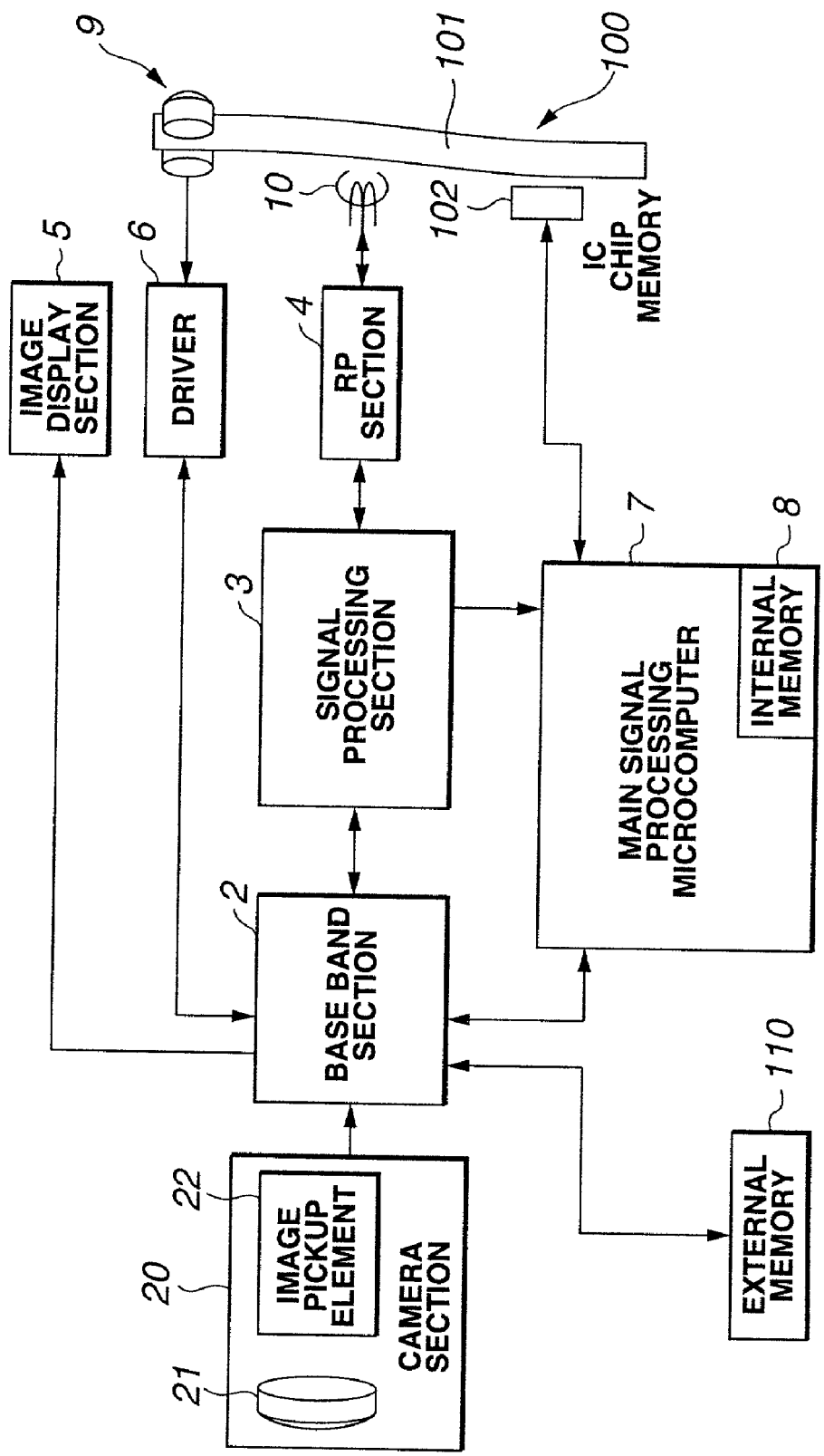
FIG. 1 is a schematic block diagram of a VCR that is an embodiment of the present invention.

Referring to FIG. 1, the VCR comprises a camera section 20, a base band section 2, a signal processing section 3, an amplifier section 4, an image display section 5, a driver 6, a main signal processing microcomputer (to be referred to simply as microcomputer hereinafter), an internal memory 8 of the microcomputer 7, a tape drive mechanism 9 and a recording/reproduction head section 10. The camera section 20 has a lens 21 and an image pickup element 22. The VCR is additionally provided with a tape-shaped medium receiving section (not shown) for receiving a video cassette tape 100 and an external memory receiving section (not shown) for receiving an external memory. The external memory 110 is a small external semiconductor memory. The use of a thin and plate-shaped "Memory Stick (trademark)" may be a preferable choice for the external memory 110. The video cassette tape 100 contains therein a semiconductor memory (IC chip memory) 102 for storing retrieval-serving data for the video data recorded in the video cassette tape 100.

Of the VCR having the above described configuration, the camera section 20 is an image pickup section, whereas the base band section 2, the signal processing section 3 and the RP section 4 operate for recording the video data obtained by the image pickup operation of the camera section 20 in the video cassette tape 100 and reproducing any of the video data recorded in the video cassette tape 100.

Of the VCR, the microcomputer 7 operates in various different ways. More specifically, the microcomputer 7 operates for acquiring recording information for each set of video data in the video cassette tape 100 (e.g., information on the starting point of a recording operation on the video tape as will be described in greater detail hereinafter) and storing it in the internal memory 8, or the internal storage means, for reading each set of video data recorded in the video cassette tape 100 and generating an index-related image to be used for recognizing the set of video data on the basis of the set of video data, for generating a retrieval-serving image containing the index-related image generated by the operation of generating an index-related images and the recording information on a set of video data corresponding to the generated index-related image to be used for retrieving the set of video data recorded in the video cassette tape 100, for conserving the retrieval-serving image data generated by the operation of generating the retrieval-serving image at least in the internal memory 8 operating as memory for storing retrieval-serving image data, in the external memory 110 and, if possible, also in the IC chip memory 102, for retrieving the contents of the data stored in the IC chip memory 102, the internal memory 8 or the external memory 110 and displaying the retrieval-serving image generated on the basis of the retrieval-serving image data stored in the IC chip 102, the internal memory 8 or the external memory 110 on the image display section 5 and for retrieving the video data corresponding to the retrieval-serving image on the basis of the recording information and in response to the selection of the retrieval-serving image displayed on the image display section 5 by the operation of retrieving the retrieval-serving image and controlling the reproduction of the reproduction means. These operations are carried out under the control of the microcomputer 7 that is adapted to control the components of the VCR. Now, the various processing operations of the components of the VCR will be discussed below.

Figure 2:
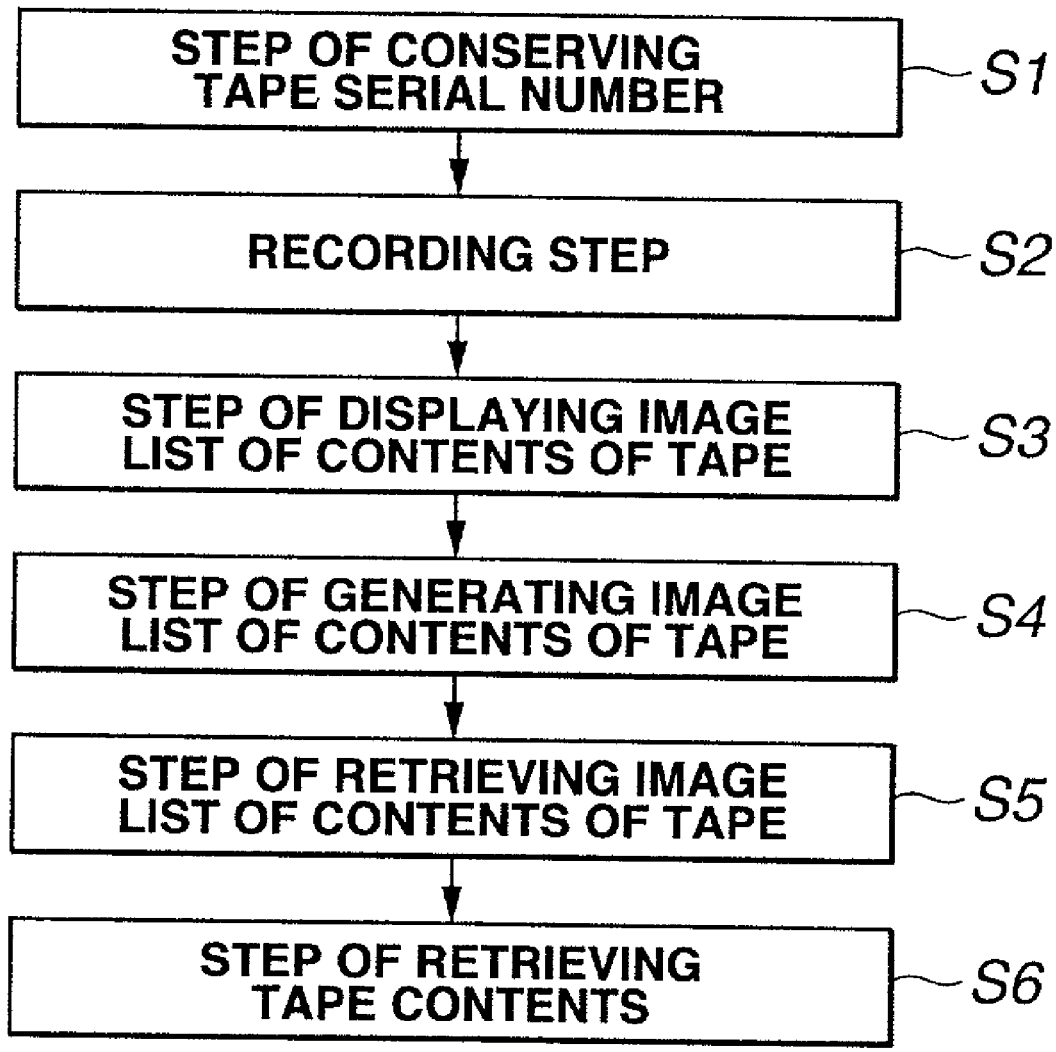
FIG. 2 is a flow chart of the printing operation of the VCR of FIG. 1, illustrating only major steps thereof.
Figure 3:
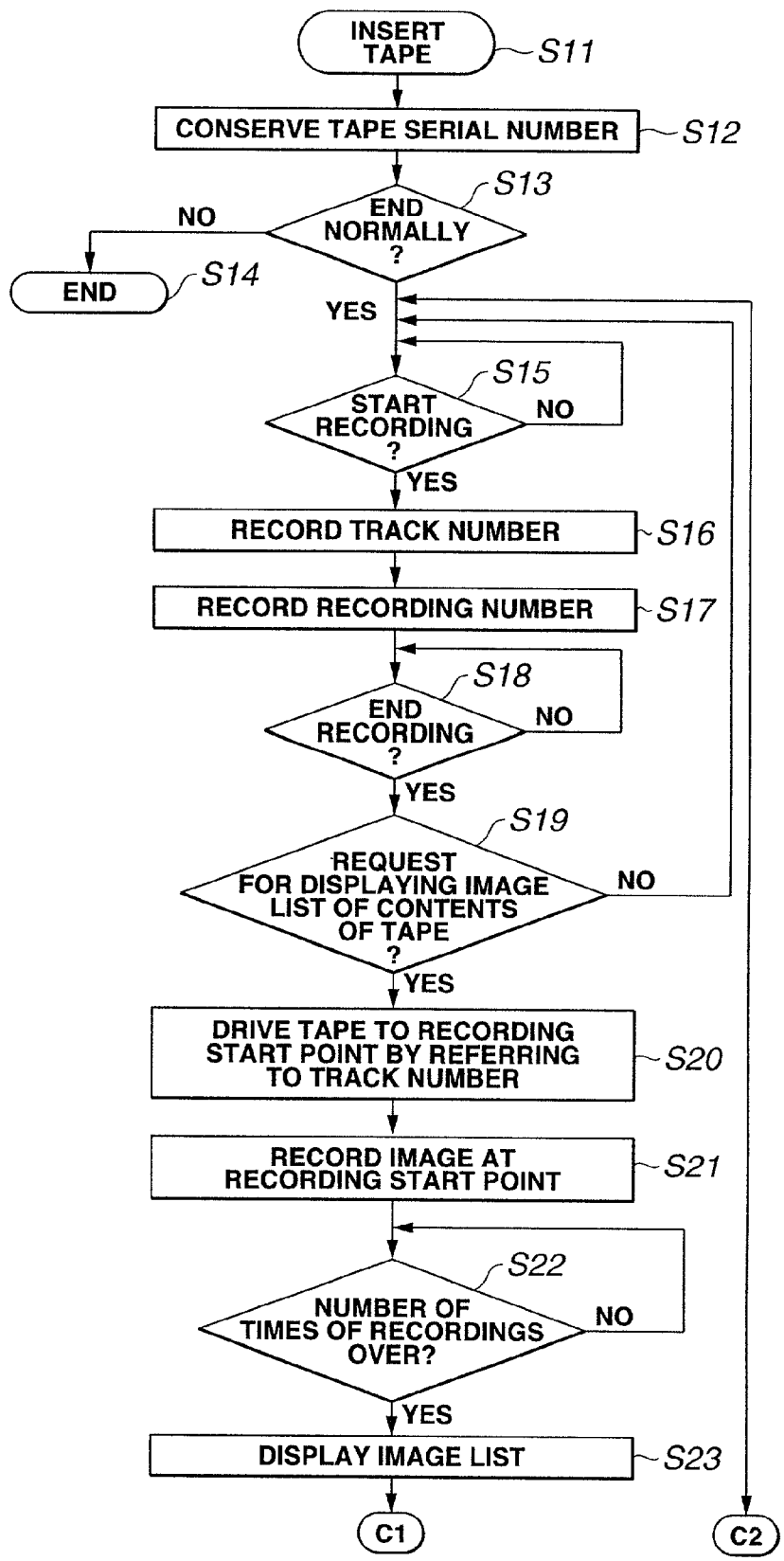
FIG. 3 is a detailed flow chart of the former part of the printing operation of the VCR of FIG. 1.
Figure 4:
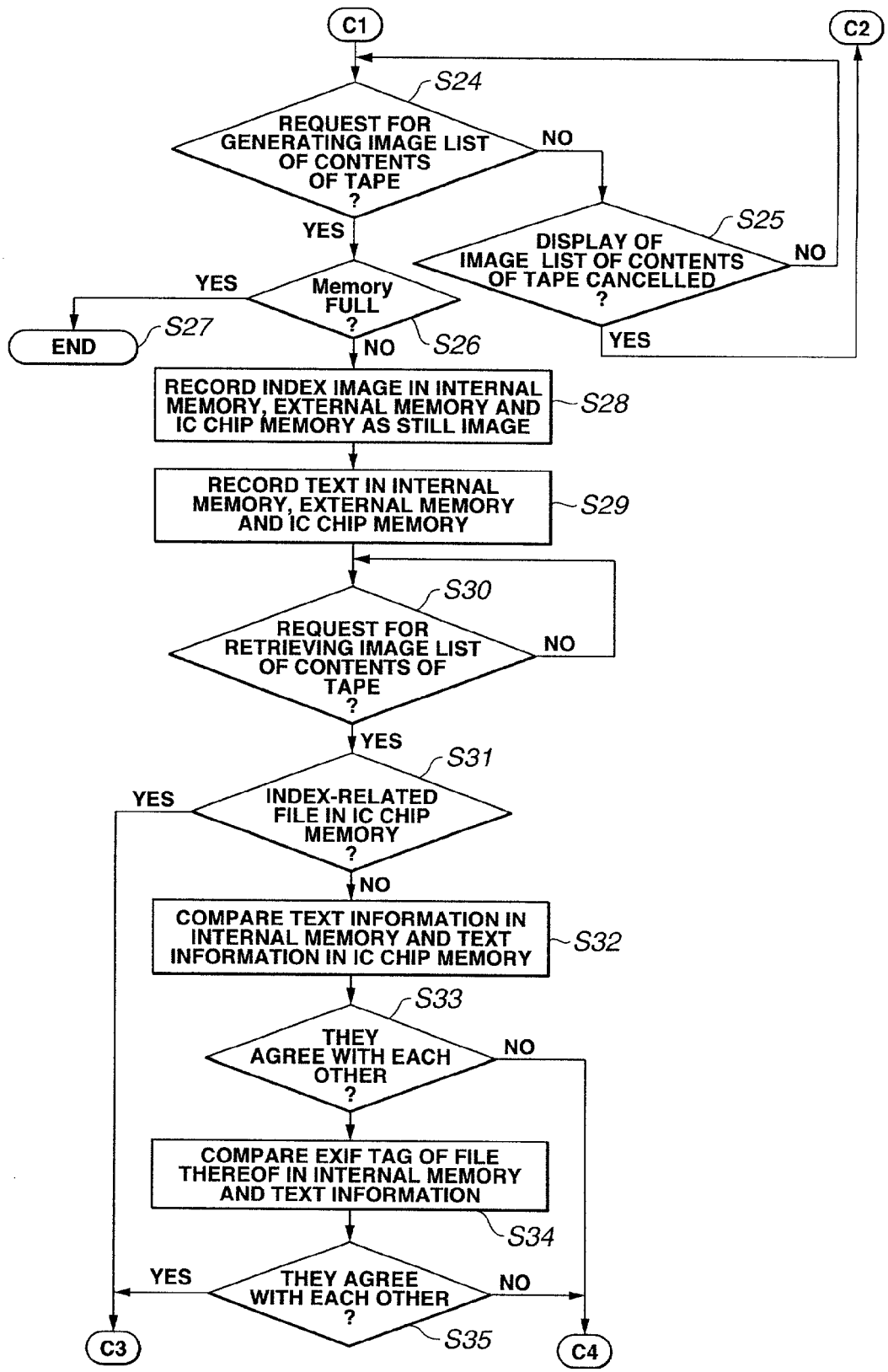
FIG. 4 is a detailed flow chart of the intermediary part of the printing operation of the VCR of FIG. 1.
Figure 5:
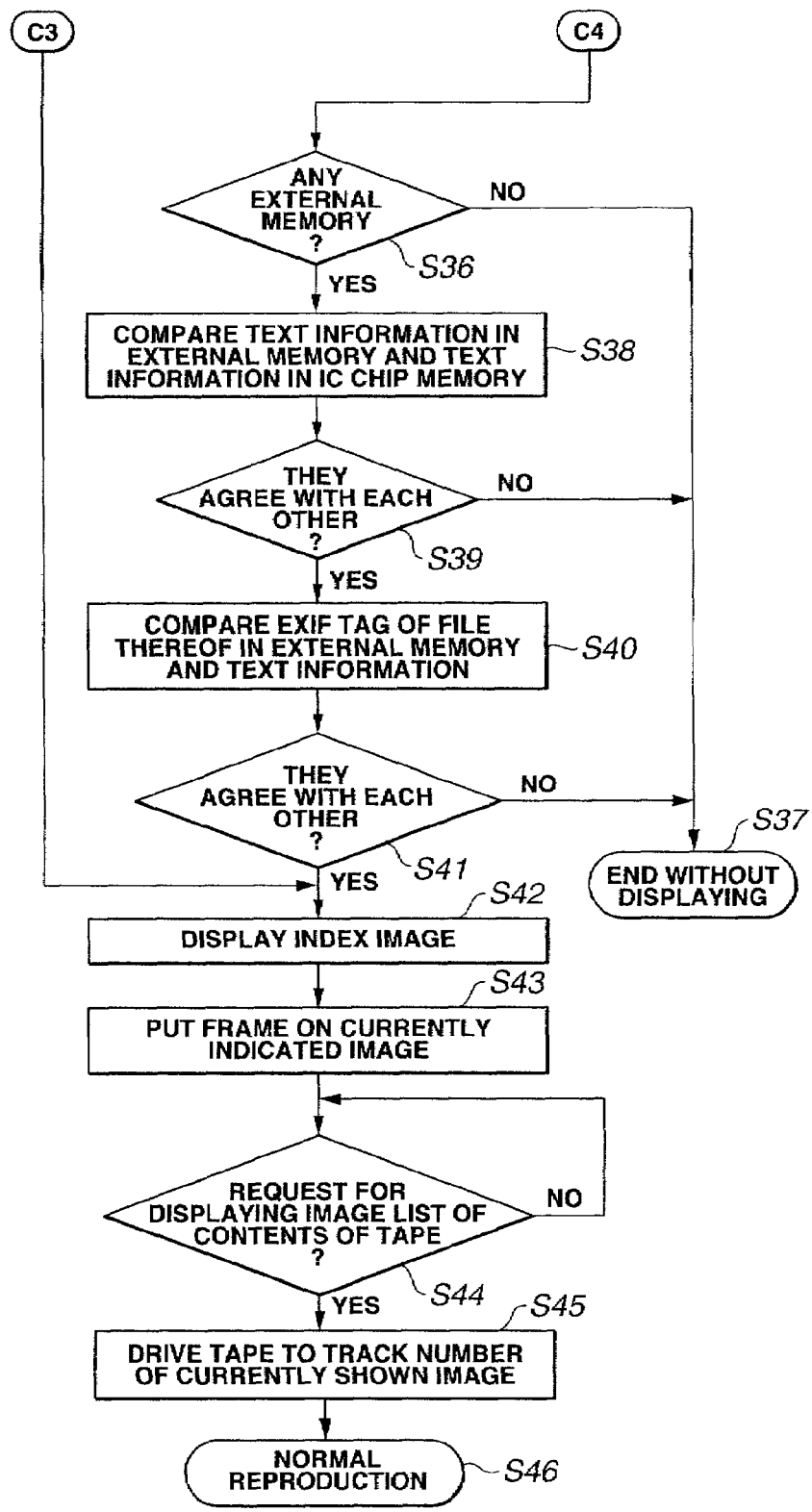
FIG. 5 is a detailed flow chart of the latter part of the printing operation of the VCR of FIG. 1.

Referring to FIG. 2, the operation of the VCR includes major steps of (1) conserving the serial number of the video tape (Step S1), (2) recording (Step S2), (3) displaying an image list of contents of the video tape (Step S3), (4) preparing images illustrating an image list of contents of the video tape (Step S4), (5) retrieving the images in an image list of contents of the video tape (Step S5) and (6) retrieving the desired image data from the tape (Step S6). FIGS. 3 through 5 illustrate detailed flow charts of these processing steps. The above processing steps will be described hereinafter in greater detail by referring to the block diagrams of FIGS. 6, 7, 8, 12 and 16, which illustrate the components necessary for the corresponding respective steps.

Figure 6:
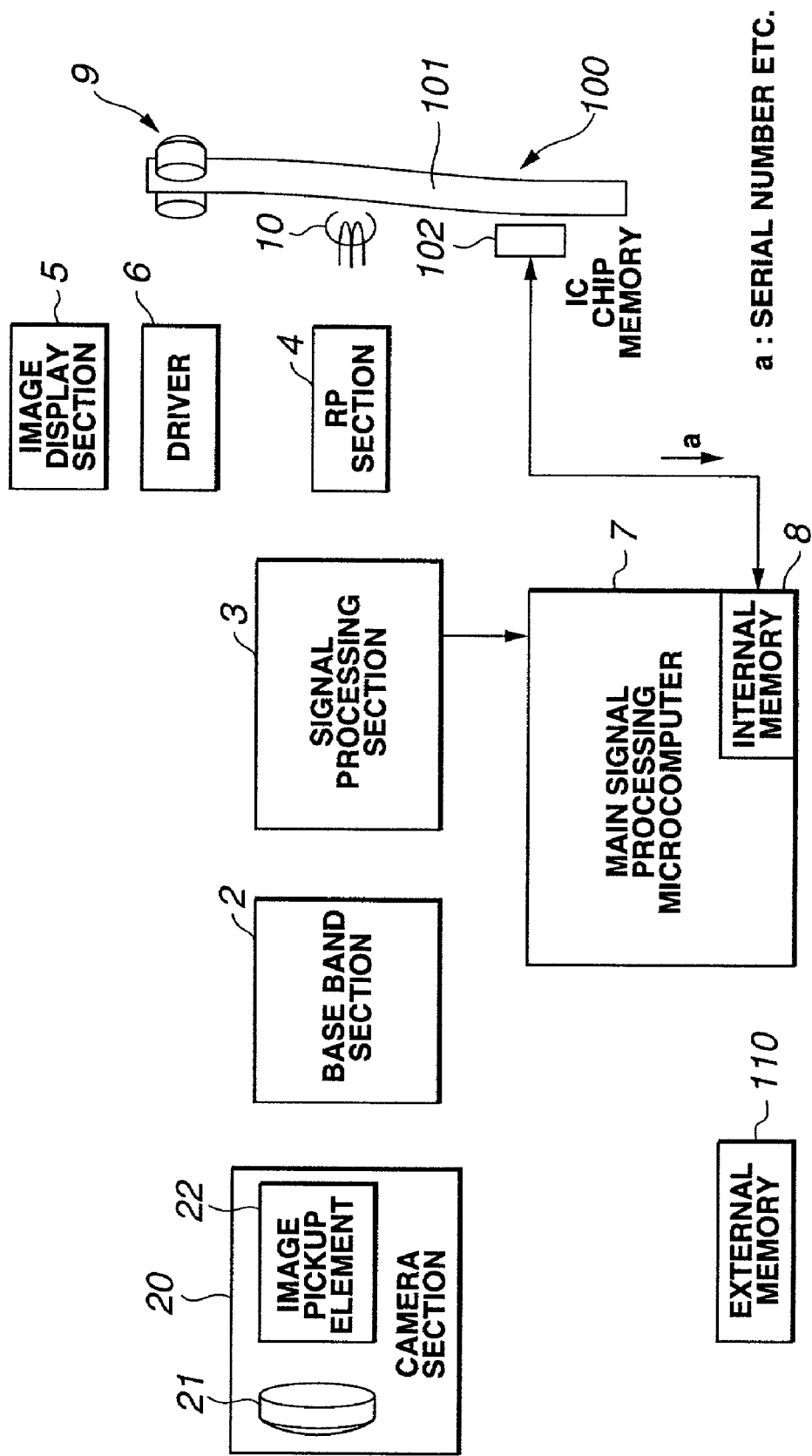
FIG. 6 is a schematic block diagram of the VCR, illustrating the components to be used for the step of storing a serial number of a video tape.

(1) Step of Conserving the Serial Number of the Video Tape (Corresponding to FIG. 6)

In the step of conserving the serial number of the video tape, as the video cassette tape 100 is put into the VCR, the information reading means (not shown) of the VCR reads the serial number of the video cassette tape 100 as information for identifying the video cassette tape from the IC chip memory 102 in the cassette and stores it in the internal memory 8 of the microcomputer 7.

The operation of this step of conserving the serial number of the video tape will be described by referring to the flow chart of FIG. 3.

Referring to FIG. 3, as a video cassette tape 100 is put into the VCR in Step S11, the serial number (signal a in FIG. 6) of the video cassette tape 100 is stored in the internal memory 8 in Step S12. Then, the VCR determines in Step S13 if the serial number is properly stored in the internal memory or not. The VCR proceeds to Step S15 if it is determined in Step S13 that the serial number is properly stored, whereas it proceeds to Step S14 to terminate the processing operation if it is determined in Step S13 that the serial number is not properly stored.

Figure 7:
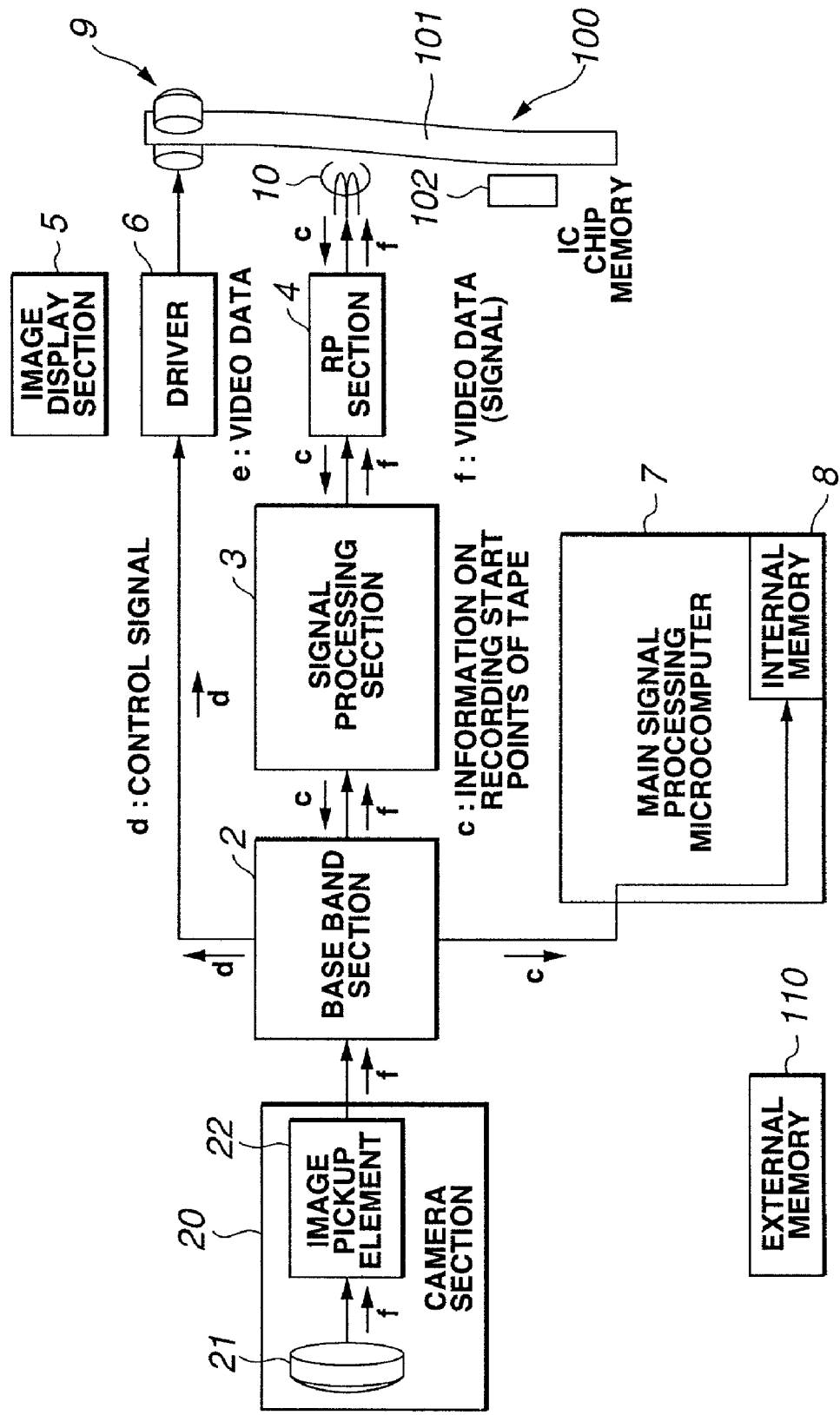
FIG. 7 is a schematic block diagram of the VCR, illustrating the components to be used for the recording step.

(2) Recording Step Corresponding to FIG. 7

In this recording step, the VCR starts recording video data (signal f in FIG. 7) to the video cassette tape 100. For instance, the VCR may start recording video data when it detects that the recording start button thereof is depressed. The operation of recording video data to the video cassette tape 100 proceeds in a manner as described below.

The rays of light (from the object shot by the camera) entering the camera section 20 by way of the lens section 21 are subjected to photoelectric conversion in the image pickup element 22. The image pickup element 22 may typically be a CCD (charge coupled device). The electric signal output from the image pickup element 22 is subjected to a base band processing operation in the base band section 2 and to a signal processing operation in the signal processing section 3. For instance, the signal processing section 3 is provided with an MPEG (Moving Picture Experts Group) codec, a stream control, an ECC and so on. Therefore, for instance, the signal processing section 3 performs a shuffling operation and an error correction code adding operation on the input signal for the purpose of coding and stream control. The video data processed by the signal processing section 3 are then recorded on the video tape 101 of the video cassette 100 by the recording/reproduction head section 10 by way of the RP section (recording/reproduction section) 4. Note that the RP section typically comprises an amplifier adapted to recording/reproduction operations.

At this time, in the driver 6, control signal (signal d in FIG. 7) controls the tape drive mechanism 9 so as to drive the video tape 101 to run in synchronism with the operation of recording video data to the video tape 101. The tape drive mechanism 9 typically comprises pinch rollers. The VCR additionally comprises a cam section (not shown) so that the driver 6 drives the tape drive mechanism 9 on the basis of the control signal from the cam section.

While recording the video data, the VCR also reads the information (recording information or signal c in FIG. 7) on the recording start point of the tape from the recording/reproduction head section 10 and stores it in the internal memory 8 of the microcomputer 7. The information on the recording start point of the tape may be the track number where the recording operation is started or the recording number of the video data. Recording numbers are numbers indicating the sequence of image pickup operations of the VCR according to which images are recorded on the video tape 101.

Now, the operation in the recording step will be described further by referring to the flow chart of FIG. 3.

Referring to FIG. 3, the VCR determines in Step S15 if it is the time for staring a recording operation or not. More specifically, the VCR detects if the recording start button is depressed or not and, it is found that the recording start button is depressed, it stores the information on the recording start point of the video tape in the internal memory 8. More specifically, the VCR stores the track number and the recording number as recording information in the internal memory 8 in Steps S16 and S17 respectively. Then, in Step S18, the VCR determines if the operation of storing the information on the recording start point of the video tape in the internal memory 8 is completed or not. If the operation is completed, the VCR proceeds to Step S19, which will be described hereinafter.

The recording step may be repeated for a number of times depending on the circumstances. In other words, the user may pick up a plurality of images. Therefore, the VCR performs the operation of video data to the video tape 101 for each picked up image and stores the information on the recording start point of the video tape for the image in the internal memory 8.

Figure 8:
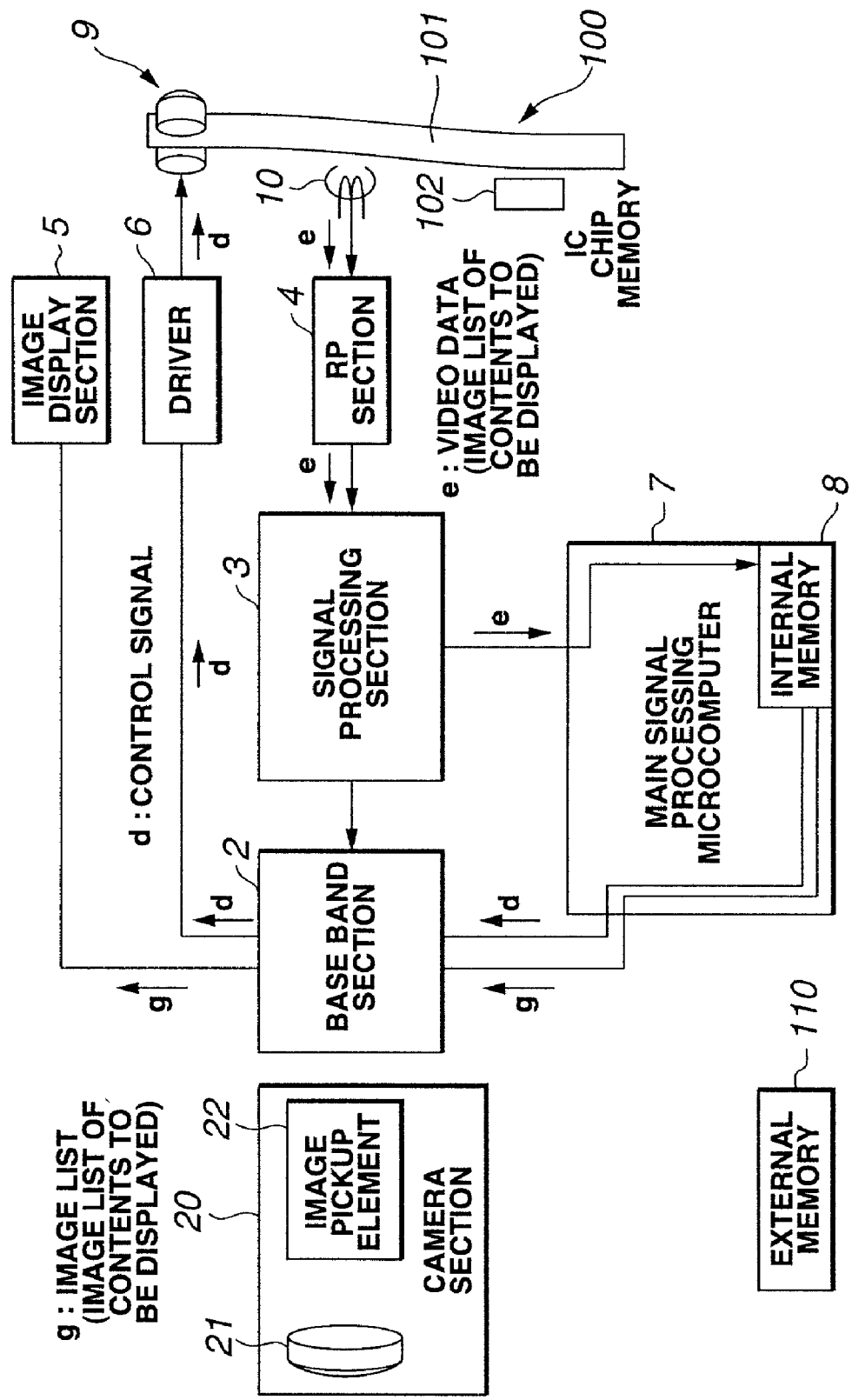
FIG. 8 is a schematic block diagram of the VCR, illustrating the components to be used for the step of displaying an image list of contents of a video tape.

(3) Step of Displaying an Image List of Contents of the Tape (Corresponding to FIG. 8)

In this step of displaying an image list of contents of the video tape, by referring to the track number and the recording number as information of the recording start point of the video tape in the internal memory 8, the VCR drives the video tape 101 to move to the recording start point and acquires an image to be displayed in a list as index-related image (signal e in FIG. 8) from the video data corresponding to the track number and the recording number as shown in FIG. 8.

At this time, the video tape 101 is fed at high speed until any desired track number by the tape drive mechanism 9 that is by turn driven by the driver 6 under the control of a control signal (signal d in FIG. 8). Then, the VCR reads the video data starting from the desired recording start point of the video tape 101 by means of the recording/reproduction head section 10 and appropriately processes the read out of video data by means of the PR section 4, the signal processing section 3 and the base band section 2 before writing them in the internal memory 8.

More specifically, the VCR prepares an image to be displayed in a list normally as a miniaturized image on the basis of the video data at the recording start point typically by means of the MPEG codec of the signal processing section 3 and stores the prepared image to be displayed in a list in the internal memory 8.

The VCR repeats the operation of preparing an image to be displayed in a list for the number of times necessary for the video data recorded in the video tape 101 (the number of image pickup operations conducted for the images recorded in the video tape 101). The video data are data that are recorded as small pieces. After repeating the operation of preparing an image to be displayed in list for the number of times necessary for the video data recorded in the video tape 101, it displays an image list of contents of the video tape (signal g in FIG. 8) containing the plurality of images to be displayed in a list and stored in the internal memory 8 on the image display section 5 as retrieval-serving image. The image list of contents of the video tape refers to an index image containing the plurality of images to be displayed in a list as stored in the internal memory 8. Thus, for instance, an image list of contents of the video tape may be prepared from the plurality of images to be displayed in a list that are stored in the internal memory 8 by the base band section 2 and displayed on the image display section 5.

The image display section 5 is in fact an OSD (on screen display) panel. It may be so arranged that the VCR starts the above operation of the step of displaying an image list of contents of the tape when the mode of operation of this step is selected (mode selection) from the menu displayed on the image display section 5 or when a dedicated operation button (e.g., "list display button") is depressed.

This step of displaying an image list of contents of the tape will be described further by referring to the flow chart of FIG. 3.

Referring to FIG. 3, the VCR determines in Step S19 if a request for displaying an image list of contents of the tape is made or not. In other words, the VCR determines if the mode of operation of this step is selected or the operation button is depressed. If it is determined that a request for displaying an image list of contents of the tape is made, the VCR proceeds to Step S20, where it refers to the track number and causes the tape to run to the recording start point, and then in Step S21, it stores the image (still picture) at the recording start point in the internal memory 8. Then, the VCR proceeds to Step S22, where it determines if the operation of Step S21 is repeated for the number of times necessary for the video data recorded in the video tape or not until all the images of the recording start points of the video cassette tape 100 are stored in the internal memory 8. The VCR stores the number of image pickup operations conducted for the images recorded in the video tape 101 typically in the IC chip memory 102 so that it carries out the operation of Step S22 on the basis of the stored information on the number of image pickup operations. With this arrangement of terminating the operation of taking in the images at the recording start points for the number of times necessary for the video data recorded in the video tape without feeding the entire tape so that the time required for the operation of taking in the plurality of images at the recording start points can be minimized.

When it is determined in Step S22 that the operation of Step S21 is repeated for the number of times necessary for the video data recorded in the video tape, the VCR proceeds to Step S23, where it carries out a processing operation for displaying the image list of contents of the tape on the image display section 5. Then, the VCR proceeds to Step S24, which will be described hereinafter by referring to FIG. 14.

Figure 9:
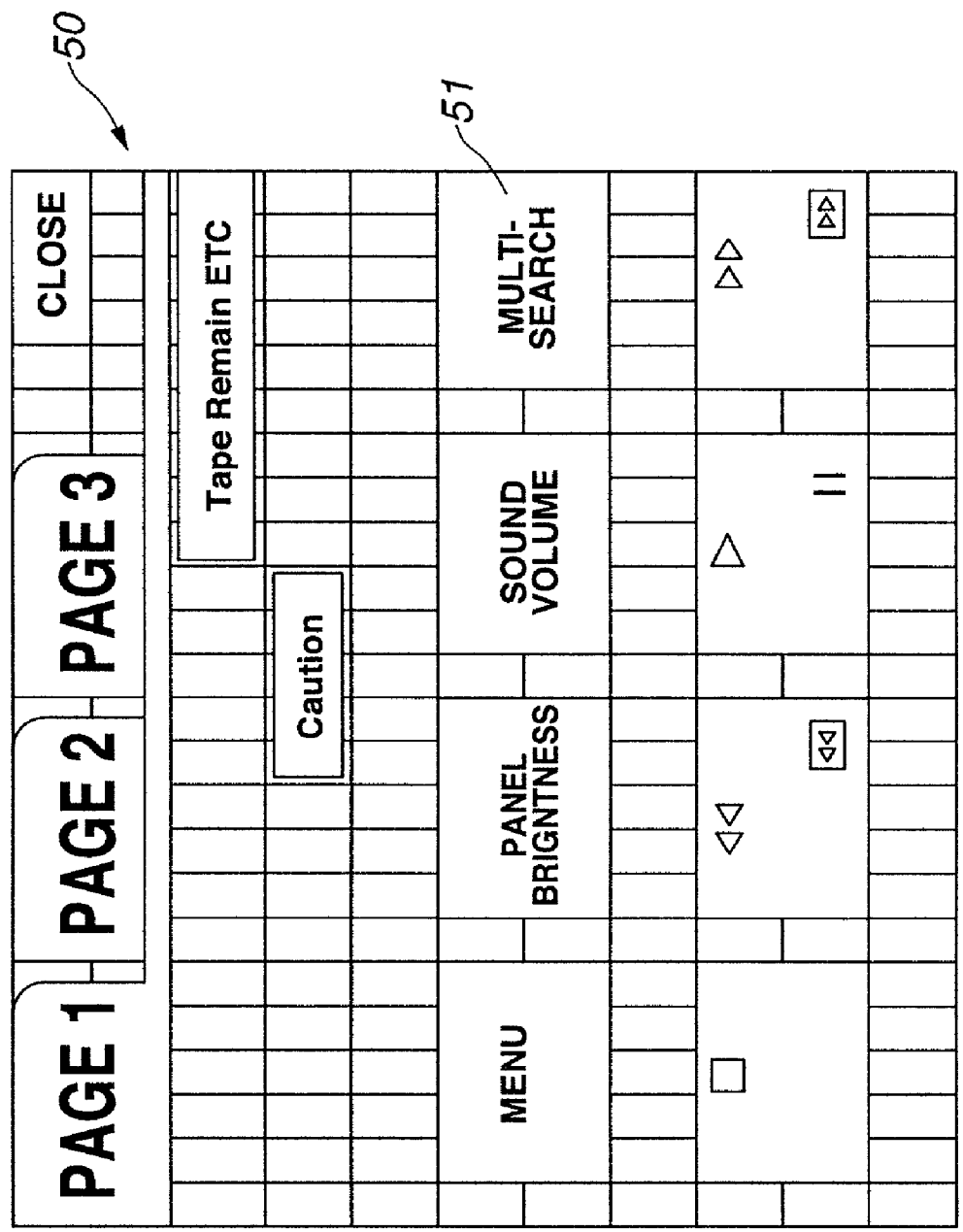
FIG. 9 is an image that can be displayed in response to a request for displaying the image list of contents of the video tape in the step of displaying the image list of contents.
Figure 10:
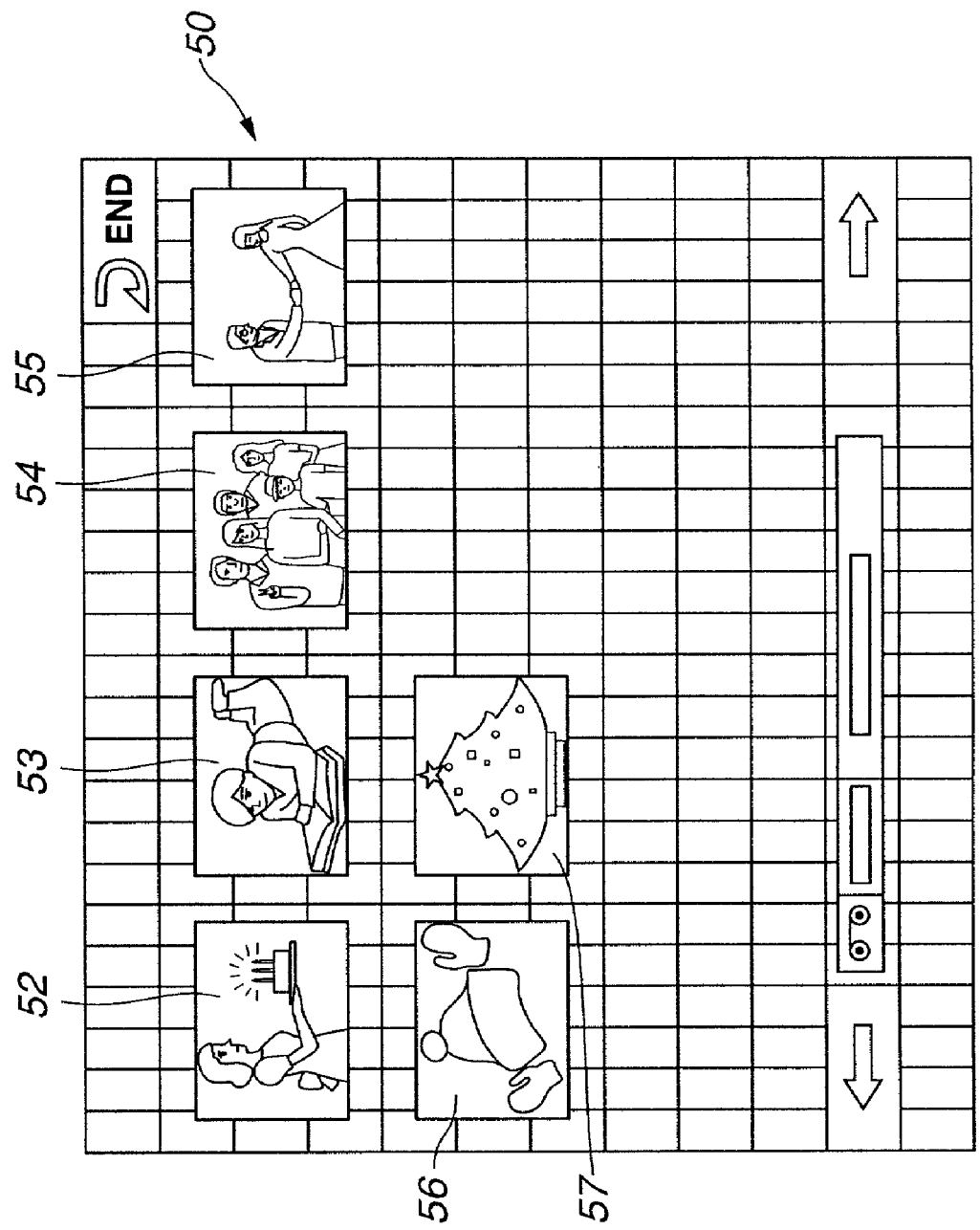
FIG. 10 is an image that can be displayed in the step of displaying the image list of contents of the video tape.
Figure 11:
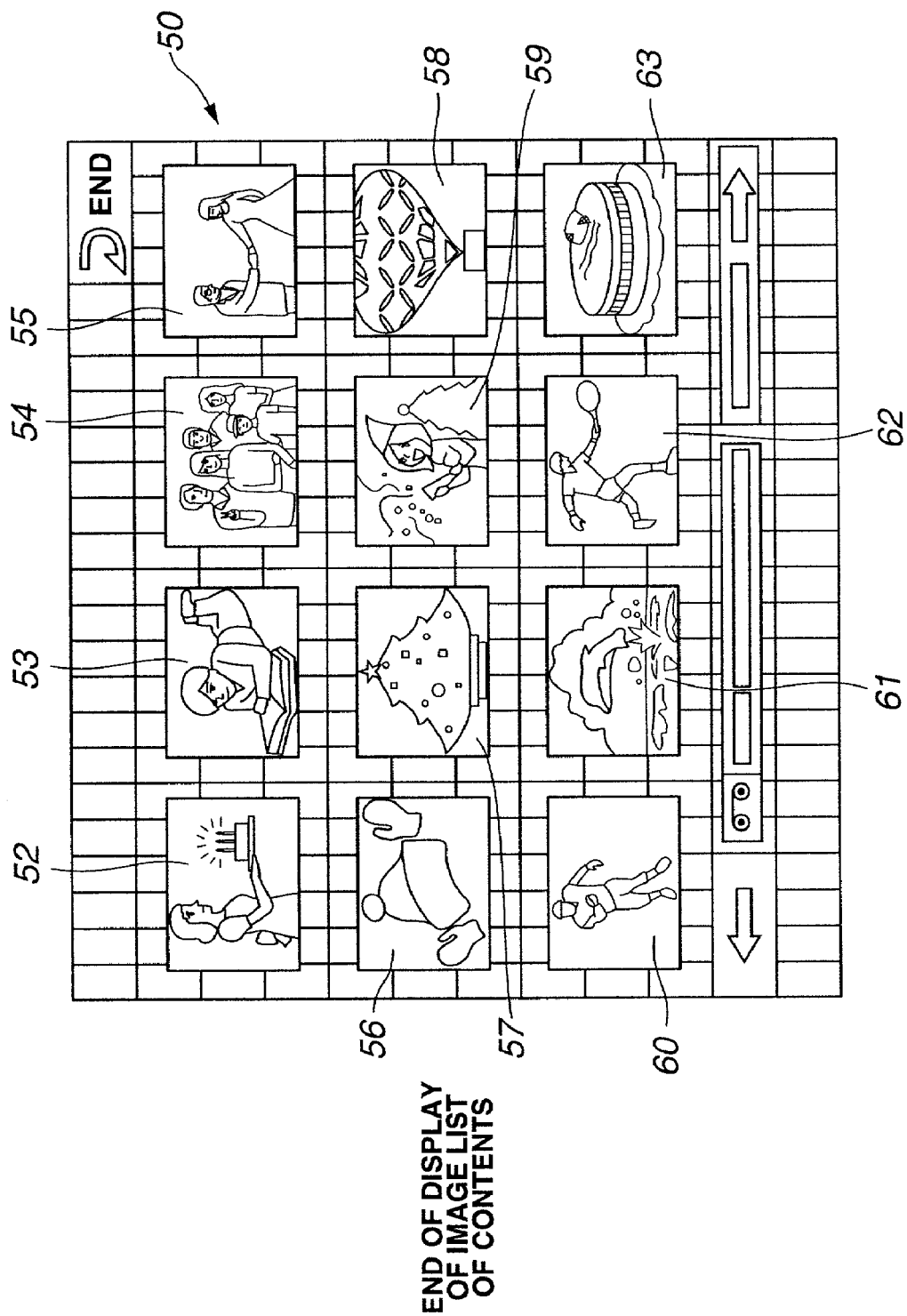
FIG. 11 is an image that can be displayed at the end of displaying the image list of contents of the video tape in the step of displaying the image list of contents.

The image list of contest of the tape is displayed on the image display section 5 in a manner as described below by referring to FIGS. 9 through 11. When multi-search (for displaying the image list of contents of the tape) 51 is selected in the menu image as shown in FIG. 9, the VCR displays the image list of contents of the tape stored in the internal memory 8 on the display screen 50 in a manner as shown in FIG. 10. The sequence of displaying the images 52, 53, 54, 55, 56, 57 to be displayed as list on the display screen 50 may be same as the sequence (of the recording numbers) according to which they are recorded in the video cassette tape 100.

As a result of the displaying operation (of display an image list of contents), a plurality of images 52, 53, 54, 55, 56, 57, 58, 59, 60, 61, 62, 63 to be displayed in a list are actually displayed in a single index image as image list of contents of the tape. When the number of images to be displayed in the list is too large and the images cannot be displayed in a single index image, the VCR prepares a plurality of index images (which may be numbered as page 1, page 2 and so on).

Figure 12:
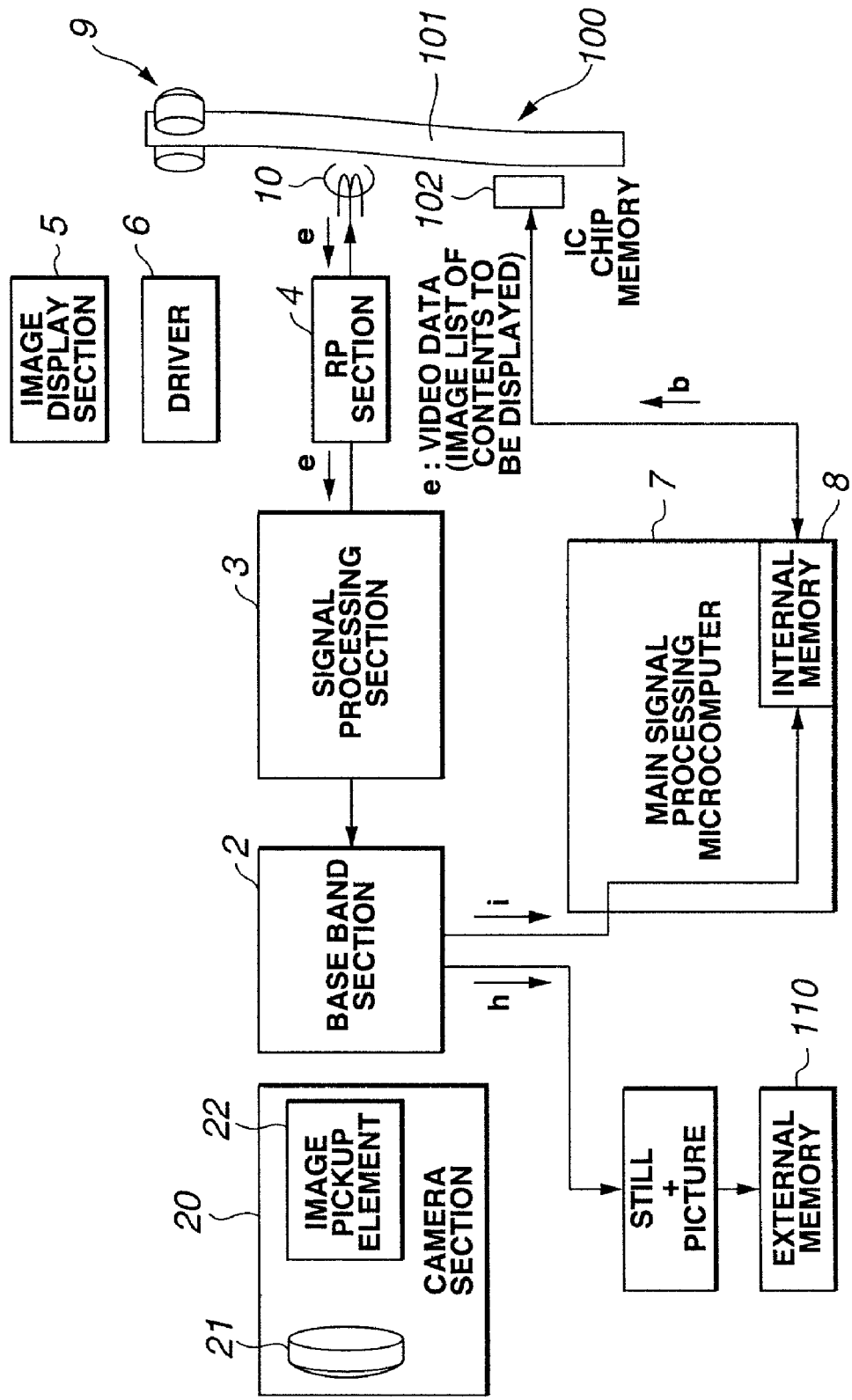
FIG. 12 is a schematic block diagram of the VCR, illustrating the components to be used for the step of preparing an image list of contents of the video tape.

(4) Step of Preparing an Image List of Contents of the Tape (Corresponding to FIG. 12)

In this step of preparing an image list of contents of the tape, the VCR records the image list of contents of the tape displayed on the image display section 5 in a memory means as an image. The operation of this step of preparing an image list of contents the tape starts when the mode of operation of this step is selected (mode selection) from the menu displayed on the image display section 5 or when a dedicated operation button (e.g., "list preparation button") is depressed, while the image list of contents of the tape is being displayed on the image display section 5.

Then, the VCR records (stores) the image list of contents of the tape in the internal memory 7 as memory means, the IC chip memory 102 and the external memory 110. The VCR stores the image list of contents of the tape as a still picture in these memories. More specifically, the image list of contents of the tape prepared by the base band section 2 so as to be displayed on the image display section 5 is stored in the external memory 110 (see the flow of signal h and STILL+PICTURE data in FIG. 12), in the internal memory 8 (see the flow of signal i in FIG. 12) and also in the IC chip memory 102 by way of the internal memory 8 (see the flow of signal b in FIG. 12).

The image file format for storing the image list of contents of the tape may be the Exif (exchangeable image file) format adapted to store reduced images (thumb nail images). With the Exif format, supplementary information (Exif tag) on the images including the times and dates when the images are shot and so on can be recorded. The Exif tag is stored in a storage area exclusively dedicated to the manufacturer. In other words, the storage area is available to the user. When such a file format is used, the VCR records the image list of contents of the tape in the Exif format and the related information including the serial number of the tape, the ID number of the recording apparatus used for the recording, information on the time and date when the image list of contents of the tape is prepared, the track numbers and the recording numbers of the recording start points of the tape in the Exif tag.

Additionally, the VCR records information in the text format (to be referred to as text information hereinafter) in the above memory means. For instance, the VCR may store the serial number of the tape, the ID number of the recording apparatus used for the recording, the time and date when the image list of contents of the tape is prepared and the file names of the files recorded as still pictures in the above memory means. When the serial number of the video cassette tape and the ID number of the recording apparatus used for the recording are already stored in the memory means, the VCR updates them.

Figure 13A:
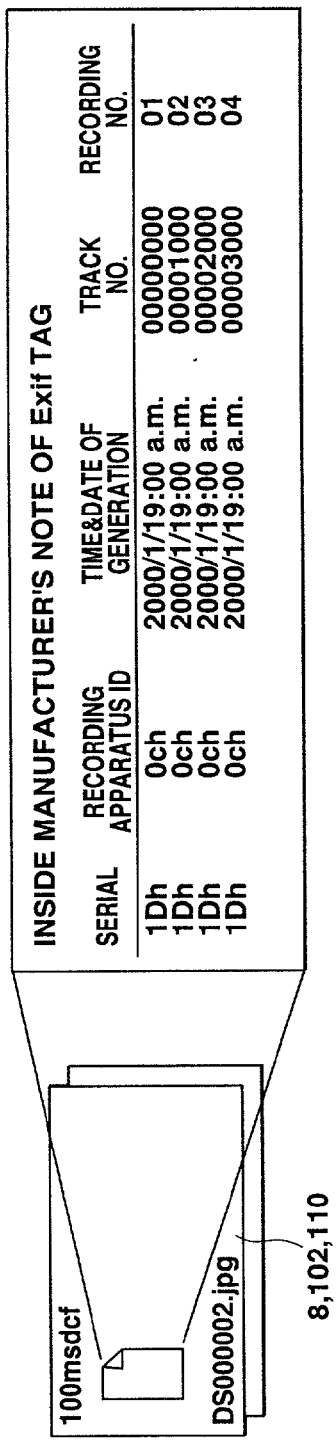
FIG. 13 is a schematic illustration of some of the formats that can be used for recording various different information in a memory.
Figure 13B:
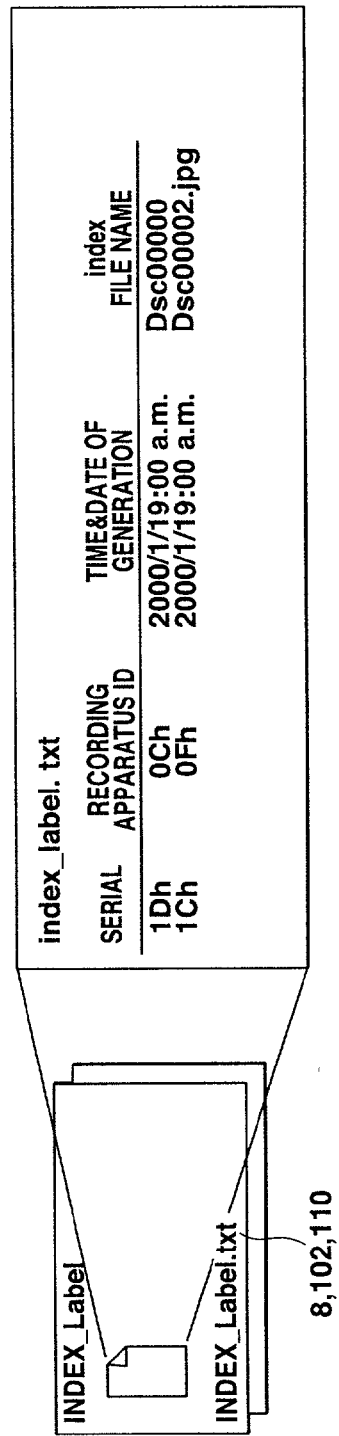

FIG. 13 is a schematic illustration of some of the formats that can be used for recording various different data in the internal memory 8, the IC chip memory 102 and the external memory 110. For instance, the image list of contents of the tape may be recorded as still picture in 100 mcdcf folder as shown in (A) of FIG. 13. In this example, the serial number of the tape, the ID number of the recording apparatus, the time and date when the image list of contents of the tape is prepared, the track numbers and the recording numbers are stored in the manufacturer's note (storage area available to the user where the manufacturer is authorized to use) in the Exif tag. Additionally, the image list of contents of the tape may be stored in the text format in INDEX_Label folder as shown in (B) of FIG. 13. In this example, the serial number of the tape, the ID number of the recording apparatus, the time and date when the image list of contents of the tape is prepared and the index file names are recorded as INDEX-_Label.txt.

Since the storage capacity of the IC chip memory 102 of the video cassette tape 100 is relatively small, the VCR does not usually store such a still picture in the IC chip memory 102. Thus, the VCR stores the image list of contents of the tape only in the internal memory 8 or the external memory 110.

This step of preparing an image list of contents of the tape will be described further by referring to the flow chart of FIG. 4.

Referring to FIG. 4, the VCR determines in Step S24 if a request for preparing an image list of contents of the tape is made or not. In other words, the VCR determines if the mode of operation of this step is selected or the operation button is depressed. If it is determined that a request for preparing an image list of contents of the tape is not made, the VCR proceeds to Step S25. If, on the other hand, it is determined that a request for preparing an image list of contents of the tape is made, the VCR proceeds to Step S26.

In Step S25, the VCR determines if the display of the image list of contents of the tape is cancelled or not. If it is determined that the display of the image list of contents of the tape is cancelled, the converter restarts the above described recording operation from Step S15. If, on the other hand, it is determined that the display of the image list of contents of the tape is not cancelled, the VCR returns to Step S24 and determines again if a request for preparing an image list of contents of the tape is made or not. The display of the image list of contents of the tape is cancelled typically when the user changed his or her mind and selected an operation of preparing an image list of contents of some other tape.

As described above, the VCR proceeds to Step S26 when it is determined that a request for preparing an image list of contents of the tape is made. In Step S26, the VCR determines if all the memories is full or not. If the memories are full, it terminates the processing operation. More specifically, if it is found in Step S26 that all the memories including the IC chip memory 102, the internal memory 8 and the external memory 110 are full, the VCR terminates the processing operation.

If, on the other hand, it is found that not all the memories are full, the VCR proceeds to Step S28, where it stores the index image in the internal memory 8, the external memory 110 and the IC chip memory 102 as still picture. Then, the VCR proceeds to Step S28, where stores the information in the text format in the internal memory 8, the external memory 110 and the IC chip memory 102. After the recording operation, the VCR proceeds to Step S30, which will be described hereinafter.

Figure 14:
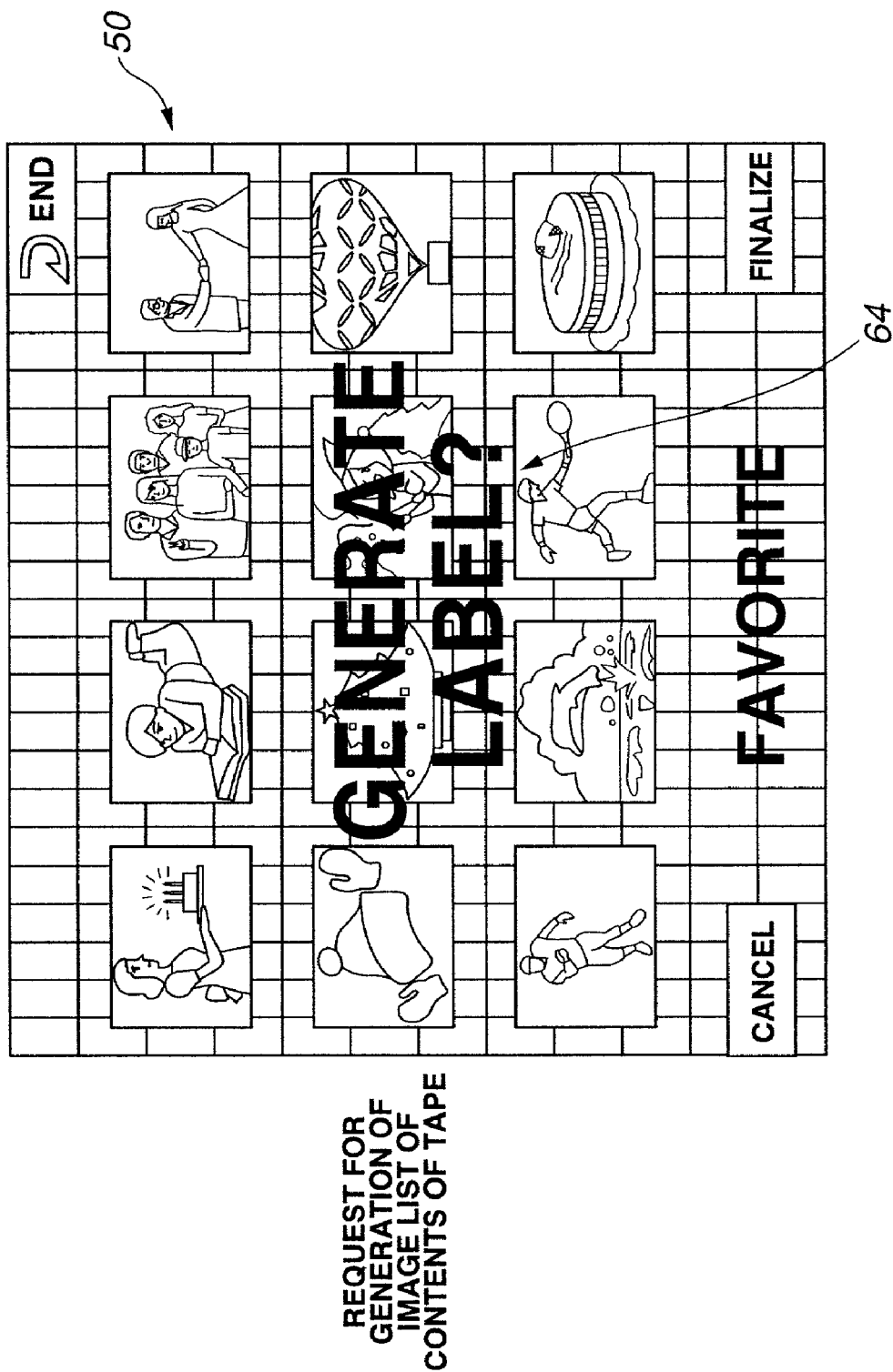
FIG. 14 is an image that can be displayed in response to a request for preparing an image list of contents of the video tape.
Figure 15:
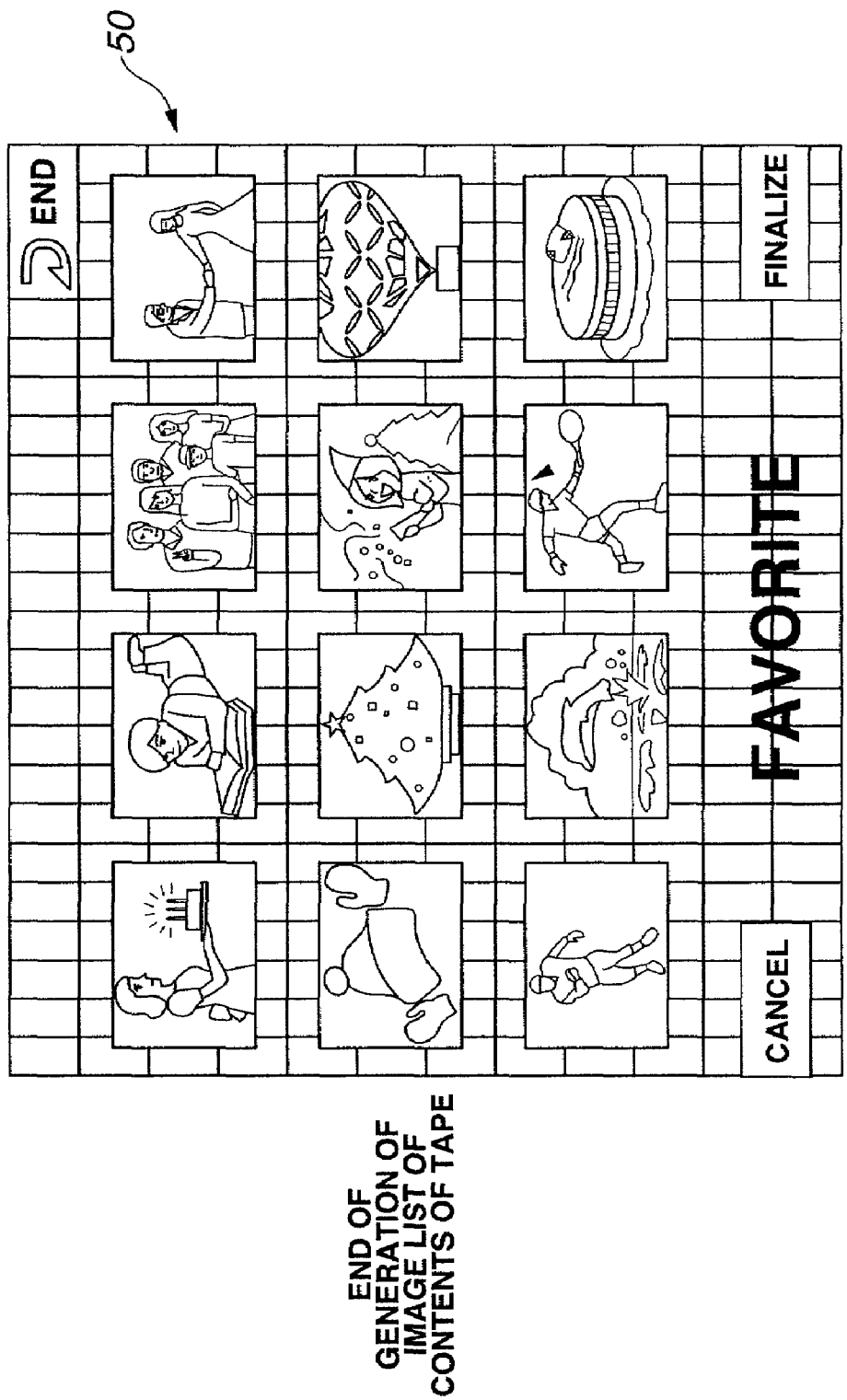
FIG. 15 is an image that can be displayed at the end of preparing an image list of contents of the video tape.

In the above described processing operation, the VCR displays a question "Prepare a label?" on the image list of contents of the tape as shown in FIG. 14 when there is a request for preparing an image list of contents of the tape (on the part of the user). When the image list of contents of the tape is finalized, the VCR typically displays an image as shown in FIG. 15.

It should be noted here that the image list of contents of the tape does not necessarily be prepared after all the images to be displayed in a list are prepared for the video data recorded in the video tape 101. For example, if ten sets of video data are stored in the video tape, the image list of contents of the tape will normally be prepared after ten images to be displayed in a list are prepared for the video data recorded in the video tape 101. However, if a request for preparing an image list of contents of the tape is detected when the image to be displayed in a list for the fifth set of video data is prepared, the VCR will prepare an image list of contents of the tape containing only five images to be displayed in the list. In such a case, the VCR records the image list of contents of the tape in the memories from the base band section 2 as shown in FIG. 12 (see the flows of signals i, h, b in FIG. 12) and reads the sixth set and the subsequent sets of video data (see the flow of signal e in FIG. 12).

(5) Step of Retrieving the Images in an Image List of Contents of the Video Tape In this step of retrieving the images in an image list of contents of the video tape, the VCR retrieves the image list of contents of the video tape stored in the IC chip memory 102, the internal memory 8 and the external memory 110 and displays the image list of contents of the video tape prepared in the step of preparing an image list of contents of the tape of (4) above on the image display section 5. The operation of this step of retrieving the image list of contents of the video tape starts when the video cassette is put into the VCR, when the mode of operation of this step of retrieving the images in the image list of contents of the video tape is selected (mode selection) from the menu displayed on the image display section 5 or when a dedicated operation button (e.g., "the image list of contents retrieval button") is depressed.

As the operation of retrieving the images in the image list of contents of the video tape is started, the VCR carries out the operation in a manner as described below.

The VCR reads out the image list of contents of the video tape from the IC chip memory 102 as still picture file. However, the image list of contents of the video tape may not be stored in the IC chip memory 102 in the above step of preparing the image list of contents of the video tape if the storage capacity of the IC chip memory 102 is too small. Therefore, it will be appreciated that the operation of reading out the image list of contents of the video tape from the IC chip memory 102 is carried out only when the IC chip memory 102 has a sufficient storage capacity.

If the storage capacity of the IC chip memory 102 is not large enough, the VCR firstly refers to the text information and then to the Exif tag fitted to the image file. Then, the VCR compares the Exif tag and the text information provided as related supplementary information on the image list of contents of the tape with those stored in the internal memory 8 or the external memory 110 and reads out the image list of contents of the video tape stored in the internal memory 8 or the external memory 110. It will be appreciated that the VCR confirms that the desired image list of contents of the video tape is there by means of these two pieces of information (the Exif tag and the text information) so that it is reliably prevented from erroneously recognizing the image list of contents of the video tape. More specifically, the operation of this step proceeds in a manner as described below.

Firstly, the VCR compares the text information in the internal memory 8 and the text information read out from the IC chip memory 102 and retrieves the text information that entirely agrees with the read out text information in terms of the serial number, the ID number of the recording apparatus used for the recording, the time and date of preparing the image list of contents of the video tape and the file name of the file storing the still picture in the internal memory 8.

If the VCR detects the text information that entirely agrees with the text information as a result of the retrieving operation, the VCR also compares the information in the Exif tag of the file of the still picture stored there. If it is found that the information agrees with the counterpart stored in the IC chip memory 102, the VCR displays the corresponding image list of contents of the video tape on the image display section 5. If, on the other hand, it is found that the information does not agree with the counterpart stored in the IC chip memory 102, the VCR compares the text information in the external memory 110 and the text information read out from the IC chip memory 102 and retrieves the text information that entirely agrees with the read out text information in terms of the serial number, the ID number of the recording apparatus used for the recording, the time and date of preparing the image list of contents of the video tape and the file name of the file storing the still picture. If the VCR detects the text information that entirely agrees with the text information as a result of the retrieving operation, the VCR also compares the information in the Exif tag of the file of the still picture stored there. If it is found that the information agrees with the counterpart stored in the IC chip memory 102, the VCR displays the corresponding image list of contents of the video tape on the image display section 5. If, on the other hand, the VCR cannot detect in the external memory 110 any text information that entirely agrees with the text information read out from the IC chip memory 102, it terminate the retrieving operation.

This step of retrieving the image list of contents of the tape will be described further by referring to the flow chart of FIG. 4.

Referring to FIG. 4, the VCR determines in Step S30 if a request for retrieving the image list of contents of the tape is made or not. If it is determined that a request for retrieving the image list of contents of the tap is made, the VCR proceeds to Step S31.

In Step S31, the VCR determines if there is an index-related file of the image list of contents of the video tape stored in the IC memory chip 102 or not. If it is determined that the IC chip memory 102 stores such an index-related file, the VCR proceeds to Step S42, which will be described in greater detail by referring to FIG. 5.

If, on the other hand, it is determined that the IC chip memory 102 does not store such an index-related file, the VCR compares the text information in the internal memory 8 and the text information in the IC chip memory 102 in Step S32 and determines the outcome of the comparison in Step S33. If the two pieces of text information do not agree with each other, the VCR proceeds to Step S36, which will be described in greater detail hereinafter by referring to FIG. 5.

If, on the other hand, it is determined that the two pieces of text information agree with each other, the VCR proceeds to Step S34, where it compares the Exif tag of the file stored in the internal memory 8 and the text information, and then determines the outcome of the comparison in Step S35. If it is determined that the two pieces of information agree with each other, the VCR proceeds to Step S42, which will be described in greater detail hereinafter by referring to FIG. 5. If, on the other hand, it is determined that the two pieces of information does not agree with each other, the VCR proceeds to Step S36 shown in FIG. 5.

As pointed out above, the VCR proceeds to Step S36 when it is determined in Step S33 that the text information in the internal memory 8 does not agree with the text information in the IC chip memory 102. In this Step S36, the VCR determines if an external memory 110 is provided or not. If it is determined that no external memory is provided, the VCR terminates the operation in Step S37 without displaying an image list of contents of the video tape because it is not possible to detect any image list of contents of the video tape. If, on the other hand, it is determined that an external memory 110 is provided, the VCR proceeds to Step S38, where compares the text information stored in the external memory 110 and the text information in the IC chip memory 102. Then, the VCR determines the outcome of the comparison in Step S39. If it is determined that the two pieces of text information do not agree with each other, the VCR terminates the operation in Step S37 without displaying an image list of contents of the video tape.

If, on the other hand, it is determined that the two pieces of text information agree with each other, the VCR proceeds to Step S40, where it compares the Exif tag of the file stored in the external memory 110 and the text information, and then determines the outcome of the comparison in Step S41. If it is determined that the two pieces of information do not agree with each other, the VCR terminates the operation in Step S37 without displaying an image list of contents of the video tape. However, if it is determined that the two pieces of information agree with each other, the VCR proceeds to Step S42.

As pointed out above, the VCR proceeds to Step S42 when it is determined that there is an index-related file in the IC chip memory 102 in Step S31 or when it is determined that the Exif tag of the file in the internal memory 8 agrees with the text file in Step S35. In Step S42, the VCR displays the index-related image on the image display section 5 and proceeds to Step S43, which will be described in greater detail hereinafter.

Figure 16:
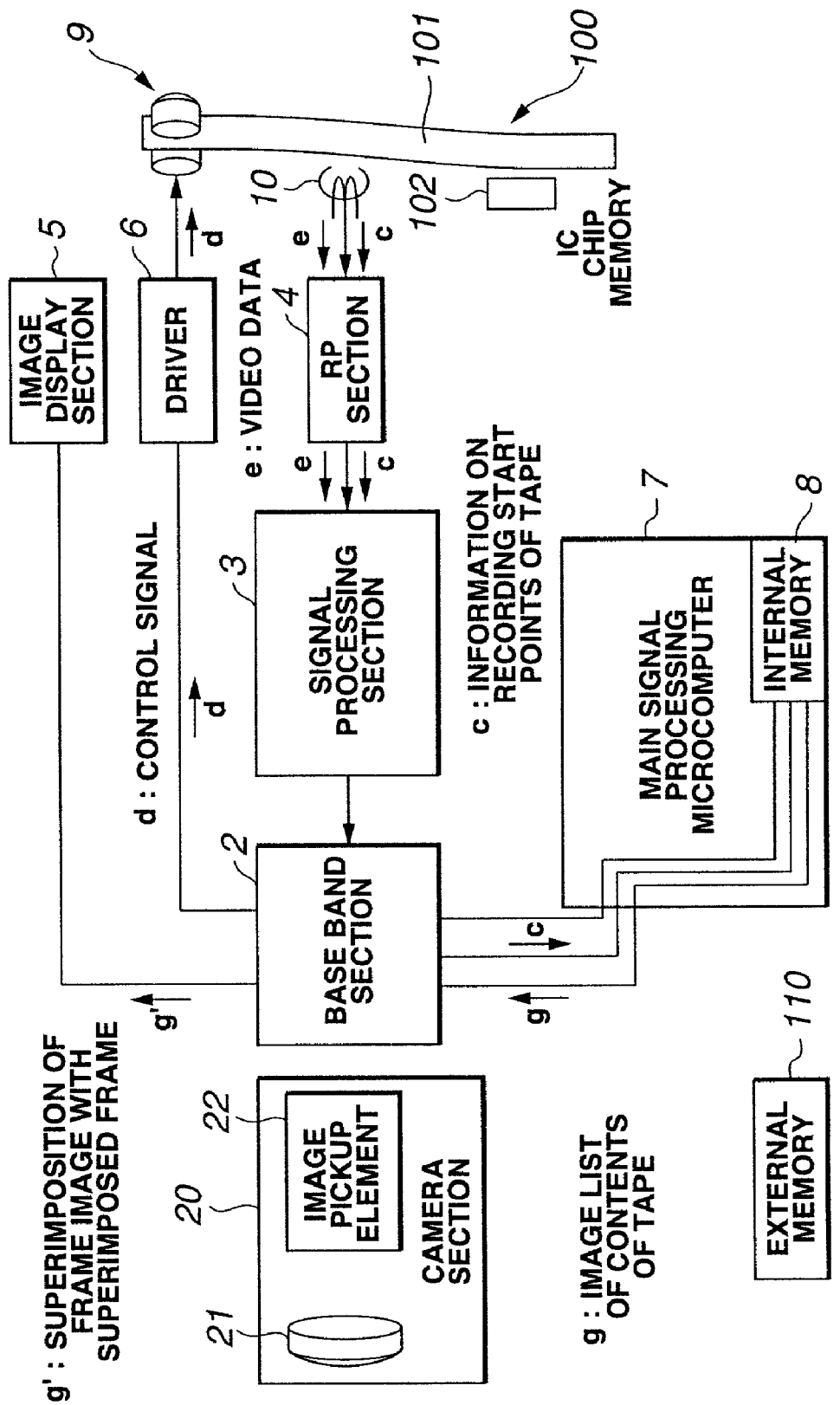
FIG. 16 is a schematic block diagram of the VCR, illustrating the components to be used for the step of retrieving the image list of contents of the video tape.

(6) Step of Retrieving the Desired Image Data from the Tape (Corresponding to FIG. 16)

In this step of retrieving the desired image data from the video tape, the VCR emphatically shows a specific one of the images of the image list of contents of the video tape displayed on the image display section 5 in the above step of retrieving the image list of contents of the video tape. For instance, the VCR may provide a specific image 61 with a thick frame 65 as shown in FIG. 17 (superimpose a thick frame) so that the user may recognize the image emphatically shown by the VCR.

Such an emphatic display is realized by synthetically combining the image list of contents of the video tape read out from the internal memory 8 (signal g in FIG. 16) and a frame by means of the base band section 2 and outputting the image list of contents of the video tape synthetically combined with the frame (signal g' in FIG. 16) to the image display section 5.

Figure 17:
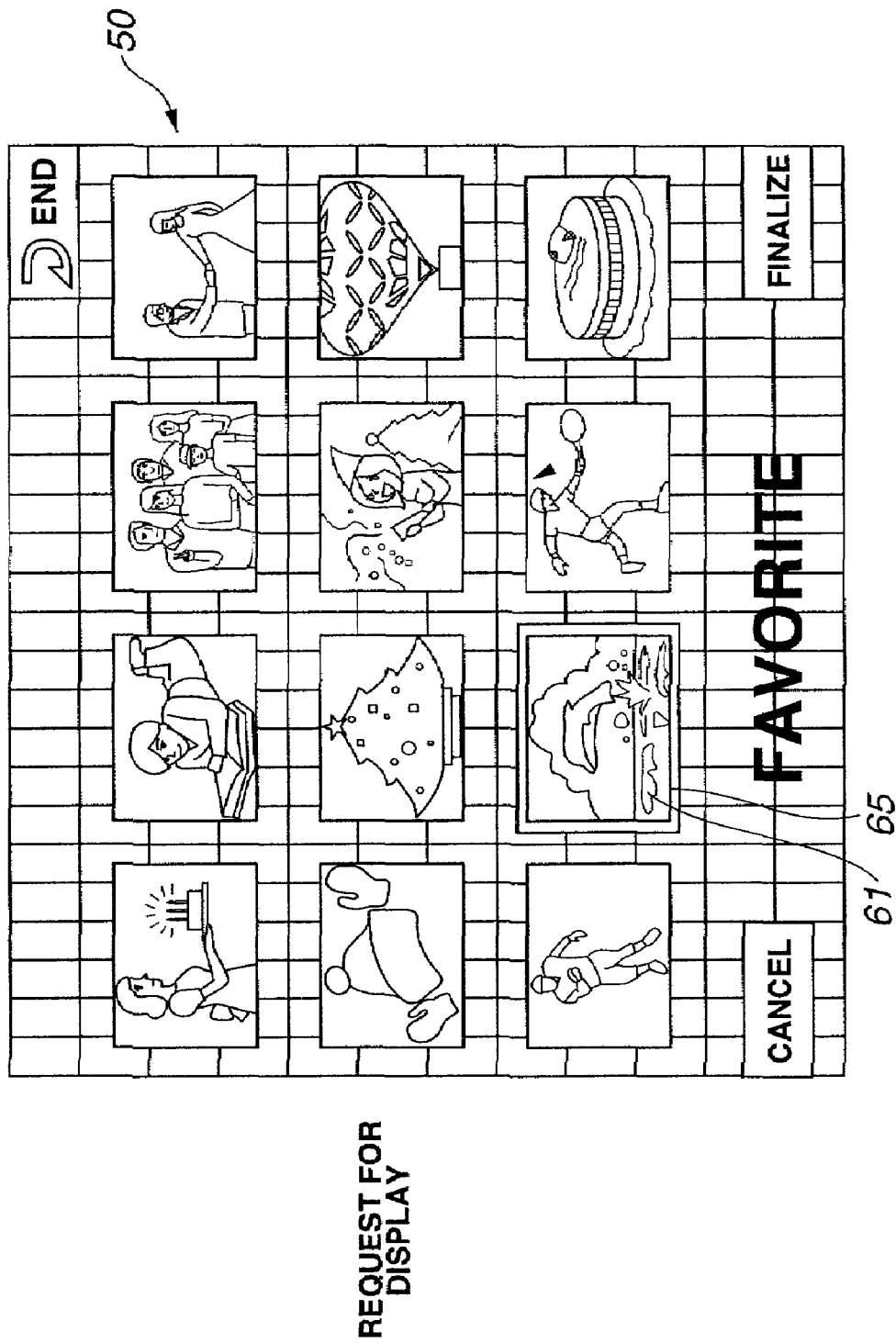
FIG. 17 is an image that can be displayed in response to a request for a display in the step of retrieving the image list of contents of the video tape.
Figure 18:
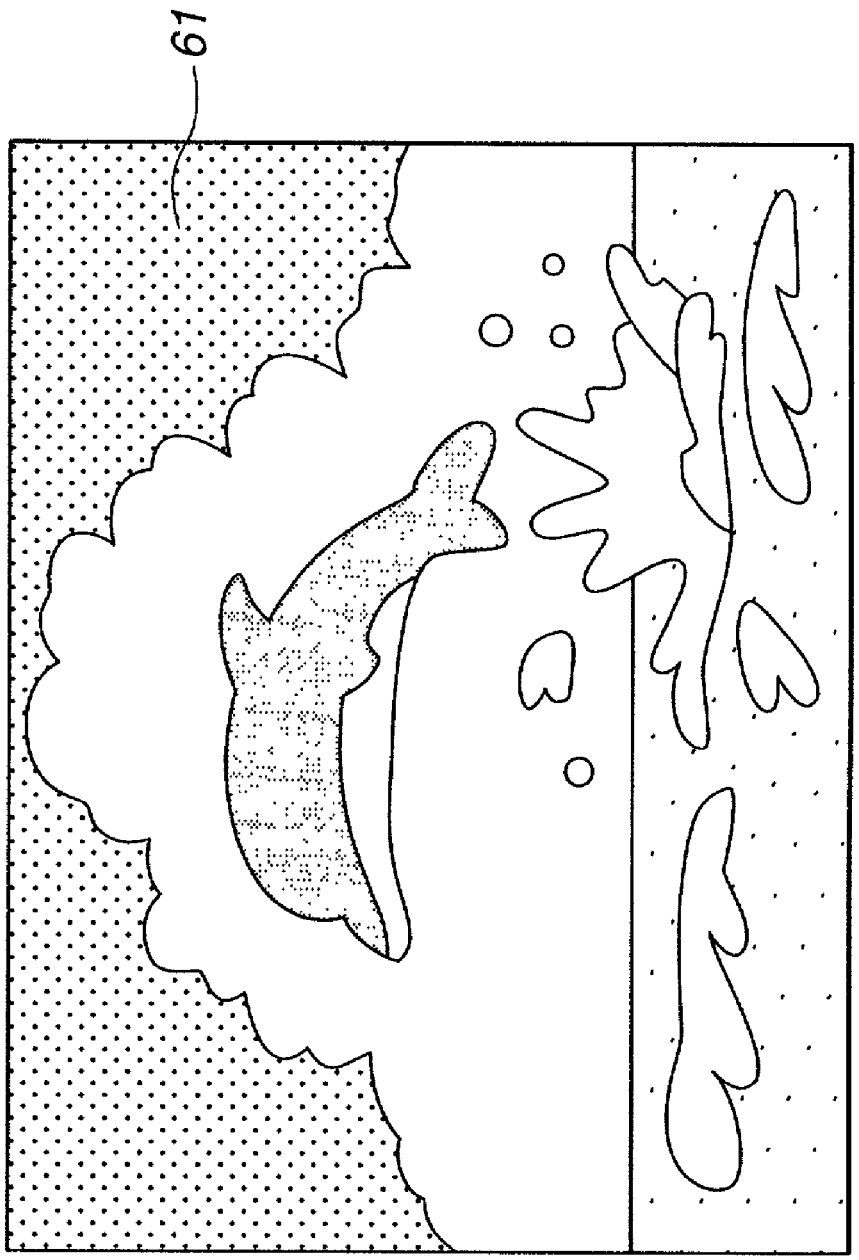
FIG. 18 is an image that can be displayed for the purpose of retrieval and reproduction in the step of retrieving the image list of contents of the video tape.

When some other image is selected, the thick frame 65 shown in FIG. 17 is adapted to move to the selected image in an interlocked manner. Thus, it may be said that the emphatic display using a thick frame 65 is only a temporary one.

Additionally, the VCR is constantly reading out the track number and the recording number of the recording start point of the image that is currently (and temporarily) selected from the video tape simultaneously with the operation of selecting the image in an interlocked manner. The VCR can read out the position of the recording/reproduction head section 10 on the video tape 101 (e.g., the track number and the recording number (signal c in FIG. 16)) from the tape so that the VCR can always recognizes the current position on the tape.

When one of the images in the image list of contents of the video tape is selected by using the menu or through an operation of the corresponding button, the VCR drives the tape to run at high speed to the recording start point of the image on the tape showing the selected track number and then performs an ordinary image reproducing operation from the track number of the recording start point on the tape to reproduce the selected image (all the corresponding video data). In other words, when the image 61 emphasized by the thick frame 65 is (ultimately) selected as shown in FIG. 17, the VCR starts reproducing the image corresponding to the emphasized (and miniaturized) image.

The operation of the step of retrieving the desired image data from the tape will be described in greater detail by referring to the flow chart of FIG. 5.

In Step S43, the VCR superimposes the frame on the currently selected (and miniaturized) image in the index image for emphasis. Then, in Step S44, the VCR determines if a request for displaying the image list of contents of the video tape is made or not. If it is determined that a request for displaying the image list of contents of the video tape is made, the VCR drives the tape to the track number of the image currently emphasized by the thick frame and reproduces the entire image.

Thus, the steps of (1) conserving the serial number of the video tape (Step S1), (2) recording (Step S2), (3) displaying an image list of contents of the video tape (Step S3), (4) preparing images illustrating an image list of contents of the video tape (Step S4), (5) retrieving the images in an image list of contents of the video tape (Step S5) and (6) retrieving the desired image data from the tape (Step S6) are described above.

Since the VCR can prepare an index-related file (an image list of contents of the video tape) in advance and store it as data, the user can view the index-related file of the video data in the video tape without driving the video tape (for reproducing the images recorded on the video tape).

When one of the images in the image list of contents of the video tape is selected by the user, the VCR automatically starts reproducing the moving picture corresponding to the selected image so that the user can view the moving picture he or she wants simply by selecting the corresponding image in the image list of contents of the video tape. Thus, the VCR provides a system adapted to reproduce the selected moving picture at high speed because the operation of reproducing the selected moving -picture starts when the corresponding image is selected from the image list of contents of the video tape.

Such an image list of contents of a video tape can be utilized in a manner as described below. When the VCR stores such an image list of contents of a video tape as JPEG (Joint Photographic Coding Experts Group) file, index labels can be produced by printing out the file. Additionally, a number of image lists of contents of video tapes can be stored in the external memory 110 when each of the image lists of contents is stored as JPEG file. Then, a collection of index labels can be stored in the external memory 110.

What is claimed is:

1. A data recording/reproduction apparatus with a built-in camera having a cabinet containing a semiconductor memory and adapted to record data of the picked up image in the tape-shaped recording medium contained in the cabinet and reproduce the recorded data of the picked up image from the tape-shaped recording medium, said apparatus comprising:

an image pickup section;

an image display section for displaying images;

a recording means for recording the data of the picked up image obtained by the image pickup operation of said image pickup section in said tape-shaped recording medium;

a reproduction means for reproducing the data of the picked up image recorded in said tape-shaped recording medium;

a recording information acquisition means for acquiring recording information on the data of each picked up image in said tape-shaped recording medium and storing them in an internal storage means;

an index-related image generating means for reading out the data of each picked up image recorded in said tape-shaped recording medium on the basis of said recording information recorded in said internal storage means and generating index-related images for recognizing the data of the picked up images on the basis of said data of the picked up images;

a retrieval-serving image generating means for generating retrieval-serving image data to be used for retrieving the data of the picked up images recorded in said tape-shaped recording medium, said retrieval-serving image data containing those of the index-related image generated by said index-related image generating means and the recording information of the data of said picked up images corresponding to said index-related image;

a retrieval-serving image conservation means for conserving the retrieval-serving image data generated by said retrieval-serving image generating means at least in a retrieval-serving image data storage means and, if possible, also in said semiconductor memory;

a retrieval-serving image retrieving means for retrieving the recorded data in said semiconductor memory or said retrieval-serving image data storage means and displaying a retrieval-serving image formed on the basis of the retrieval-serving image data conserved in said semiconductor memory or said retrieval-serving image data storage means; and a reproduction control means for retrieving the data of the picked up image corresponding to the index-related image selected by means of the retrieval-serving image displayed on the image display section by said retrieval-serving image retrieving means on the basis of said recording information and performing a reproducing operation by means of said reproduction means.

2. The data recording/reproduction apparatus with a built-in camera according to claim 1, wherein said retrieval-serving image conservation means conserves related information in said semiconductor memory and said retrieval-serving image data storage means along with said retrieval-serving image data; and wherein said retrieval-serving image retrieving means retrieves the contents of the data recorded in said semiconductor memory and said retrieval-serving image data storage means and, if the semiconductor memory does not store the retrieval-serving image data, reads out the retrieval-serving image data corresponding to the related information stored said semiconductor memory and the related information stored in said retrieval-serving image data storage means to display a retrieval-serving image on the image display section on the basis of the retrieval-serving image data, provided that said two pieces of related information agree with each other.

3. The data recording/reproduction apparatus with a built-in camera according to claim 2, wherein said related information is information on the image to be retrieved including at least the time and date of preparing said retrieval-serving image.

4. The data recording/reproduction apparatus with a built-in camera according to claim 2, further comprising:

an identification number reading means for reading the identification-related information of the recording medium stored in said semiconductor memory; and an identification-related information storage means for storing the identification-related information read out by said identification number reading means with the retrieval-serving image data generated by said retrieval-serving image generating means;

said related information being said identification-related information.

5. The data recording/reproduction apparatus with a built-in camera according to claim 2, wherein said related information is information for identifying the apparatus used for generating said retrieval-serving image.

6. The data recording/reproduction apparatus with a built-in camera according to claim 2, wherein said related information is provided in a text format.

7. The data recording/reproduction apparatus with a built-in camera according to claim 2, wherein said retrieval-serving image generating means generates said retrieval-serving image data in the Exif (exchangeable image file) format; and wherein said related information is written in the Exif format of said retrieval-serving image data in the authorized user region.

8. The data recording/reproduction apparatus with a built-in camera according to claim 1, wherein said retrieval-serving image data storage means is an internal memory.

9. The data recording/reproduction apparatus with a built-in camera according to claim 1, wherein said retrieval-serving image data storage means is an removably fitted external memory.

10. The data recording/reproduction apparatus with a built-in camera according to claim 1, wherein said retrieval-serving image data generating means generates index-related images that are reduced images of the recording start points of said data of the picked up images.

11. The data recording/reproduction apparatus with a built-in camera according to claim 1, wherein said recording information includes the track number of the tape-shaped recording medium storing said data of the picked up images.

12. The data recording/reproduction apparatus with a built-in camera according to claim 1, wherein the recording information corresponding to the temporarily selected index-related image shown in said retrieval-serving image is read out; and wherein said reproduction control means retrieves the data of the pickup images in response to the finalized selection of one of said index-related images on the basis of said recording information read out corresponding to said temporary selection and reproduces the corresponding image by means of said reproduction means.

13. The data recording/reproduction apparatus with a built-in camera according to claim 1, wherein a thick frame is superimposed on one of the selectable index-related images in the retrieval-serving image displayed on said image display section.

14. A data recording/reproduction method to be used with a data recording/reproduction apparatus with a built-in camera having a cabinet containing a semiconductor memory and adapted to record data of the picked up image in the tape-shaped recording medium contained in the cabinet and reproduce the recorded data of the picked up image from the tape-shaped recording medium, said method comprising the steps of:

recording the data of the picked up image obtained by the image pickup operation of said image pickup section in said tape-shaped recording medium;

acquiring recording information on the data of each picked up image in said tape-shaped recording medium and storing them in an internal storage means;

reading out the data of each picked up image recorded in said tape-shaped recording medium on the basis of said recording information recorded in said internal storage means and generating index-related images for recognizing the data of the picked up images on the basis of said data of the picked up images;

generating retrieval-serving image data to be used for retrieving the data of the picked up images recorded in said tape-shaped recording medium, said retrieval-serving image data containing those of the index-related image generated by said index-related image generating means and the recording information of the data of said picked up images corresponding to said index-related image;

conserving the retrieval-serving image data generated by said retrieval-serving image generating means at least in a retrieval-serving image data storage means and, if possible, also in said semiconductor memory;

retrieving the recorded data in said semiconductor memory or said retrieval-serving image data storage means and displaying a retrieval-serving image formed on the basis of the retrieval-serving image data conserved in said semiconductor memory or said retrieval-serving image data storage means; and retrieving the data of the picked up image corresponding to the index-related image selected by means of the retrieval-serving image displayed on the image display section by said retrieval-serving image retrieving means on the basis of said recording information and performing a reproducing operation by means of said reproduction means.

15. The data recording/reproduction method according to claim 14, wherein related information is stored in said semiconductor memory and said retrieval-serving image data storage means along with said retrieval-serving image data in said retrieval-serving image conserving step; and wherein the contents of the data recorded in said semiconductor memory and said retrieval-serving image data storage means are retrieved and, if the semiconductor memory does not store the retrieval-serving image data, the retrieval-serving image data corresponding to the related information stored said semiconductor memory and the related information stored in said retrieval-serving image data storage means are read out in said retrieval-serving image retrieving step to display a retrieval-serving image on the image display section on the basis of the retrieval-serving image data, provided that said two pieces of related information agree with each other.

16. The data recording/reproduction method according to claim 15, wherein said related information is information on the image to be retrieved including at least the time and date of preparing said retrieval-serving image.

17. The data recording/reproduction method according to claim 14, wherein said related information is information for identifying the recording medium stored in said semiconductor memory.

18. The data recording/reproduction method according to claim 14, wherein said related information is information for identifying the apparatus used for generating said retrieval-serving image.

* * * * *